US012782509B2

(12) United States Patent
Kondo et al.

(10) Patent No.: US 12,782,509 B2
(45) Date of Patent: Nov. 3, 2026

(54) RADAR DEVICE

(71) Applicant: DENSO CORPORATION, Kariya-city (JP)

(72) Inventors: Katsuhiko Kondo, Nisshin-city (JP); Yasunori Nishioka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 967 days.

(21) Appl. No.: 17/932,584

(22) Filed: Sep. 15, 2022

(65) Prior Publication Data

US 2023/0008630 A1 Jan. 12, 2023

Related U.S. Application Data

(63) Continuation of application No. PCT/JP2021/007095, filed on Feb. 25, 2021.

(30) Foreign Application Priority Data

Mar. 18, 2020 (JP) ................................ 2020-047819

(51) Int. Cl.
*G01S 7/40* (2006.01)
*G01S 7/497* (2006.01)
(Continued)

(52) U.S. Cl.
CPC .......... *G01S 7/4034* (2021.05); *G01S 13/931* (2013.01); *G01S 7/4972* (2013.01); *G01S 7/52004* (2013.01)

(58) Field of Classification Search
CPC ........... G01S 7/40–4034; G01S 13/931; G01S 7/4972; G01S 7/52004; G01S 13/867
See application file for complete search history.

(56) References Cited

U.S. PATENT DOCUMENTS 7,545,313 B2 * 6/2009 Okamura .............. G01S 7/4026 342/174
8,344,940 B2 * 1/2013 Jeong .................... G01S 7/4026 342/75
(Continued)

FOREIGN PATENT DOCUMENTS

JP 2002202360 A * 7/2002 ........... G01S 13/931
JP 2011002346 A * 1/2011
(Continued)

OTHER PUBLICATIONS

JP-2011002346-A Machine translation (Year: 2011).*
JP-2002202360-A Machine translation (Year: 2002).*

*Primary Examiner* — Matthew M Barker
(74) *Attorney, Agent, or Firm* — Precision Patents, P.C.

(57) ABSTRACT

An object information acquisition unit acquires object information including an object distance between a radar device and a reflection object and an object azimuth angle at which the reflection object is located. A roadside object extraction unit extracts roadside object information on a roadside object from the object information. An axis deviation angle estimation unit estimates a vertical axis deviation angle from the roadside object information. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

11 Claims, 14 Drawing Sheets

(51) Int. Cl.
*G01S 13/931* (2020.01)
*G01S 7/52* (2006.01)

(56) References Cited

U.S. PATENT DOCUMENTS

| | | | | |
|---|---|---|---|---|
| 10,024,955 | B2 * | 7/2018 | Song | G01S 7/4972 |
| 2005/0285778 | A1 * | 12/2005 | Shinagawa | G01S 7/4026 342/146 |
| 2007/0115169 | A1 * | 5/2007 | Kai | G01S 13/931 342/174 |
| 2010/0295722 | A1 * | 11/2010 | Shingyoji | G01S 7/4056 342/107 |
| 2011/0133915 | A1 | 6/2011 | Ito | |
| 2011/0156955 | A1 * | 6/2011 | Jeong | G01S 13/424 342/359 |
| 2013/0218398 | A1 * | 8/2013 | Gandhi | G01S 13/931 701/31.1 |
| 2016/0124076 | A1 | 5/2016 | Nakatani et al. | |
| 2016/0161597 | A1 * | 6/2016 | Treptow | G01S 13/424 342/174 |
| 2016/0299217 | A1 * | 10/2016 | Kim | G01S 7/41 |
| 2018/0341007 | A1 * | 11/2018 | Fetterman | G01S 7/4972 |
| 2019/0219673 | A1 * | 7/2019 | Morinaga | G01S 13/931 |
| 2021/0303879 | A1 * | 9/2021 | Maucher | G06V 20/584 |
| 2022/0289245 | A1 * | 9/2022 | Kuriyama | B60W 60/00186 |
| 2022/0349995 | A1 * | 11/2022 | Breddermann | G01S 7/4026 |

FOREIGN PATENT DOCUMENTS

| | | | |
|---|---|---|---|
| JP | 2014-153211 | A | 8/2014 |
| JP | 2019-066240 | A | 4/2019 |
| KR | 10-1655682 | B1 | 9/2016 |
| WO | 2007015288 | A1 | 2/2007 |

* cited by examiner

RADAR DEVICE

CROSS-REFERENCE TO RELATED APPLICATION

The present application is a continuation application of International Application No. PCT/JP2021/007095, filed on Feb. 25, 2021, which claims priority to Japanese Patent. Application No. 2020-047819, filed in Japan on Mar. 18, 2020. The contents of these applications are incorporated herein by reference in their entirety.

BACKGROUND

1. Technical Field

The present disclosure relates to a technique for estimating an axis deviation of a radar device.

2. Related Art

In conventional in-vehicle radar devices, for example, a change in the mounting condition of a radar device due to some cause may lead to a deviation of the center axis of a radar beam, that is, an axis deviation of the radar beam. Such an axis deviation reduces the accuracy in detection of an object to be detected by the radar device.

SUMMARY

The present disclosure provides a radar device including an axis deviation estimation device. As one aspect of the present disclosure, an axis deviation estimation device includes at least an object information acquisition unit, a roadside object extraction unit, and an axis deviation angle estimation unit.

The object information acquisition unit is configured to repeatedly acquire object information including an object distance and an object azimuth angle. The object distance is a distance between the radar device and a reflection object corresponding to a reflection point of a radar wave that is detected by the radar device, and the object azimuth angle is an azimuth angle at which the reflection object is located.

The roadside object extraction unit is configured to extract roadside object information on a roadside object from the object information. Specifically, the roadside object extraction unit is configured to extract the roadside object information from the object information based on a predetermined extraction condition. The roadside object information is information on the reflection point on a roadside object provided in accordance with a predetermined condition on a side of a travel path at a higher position than the travel path in a direction in which the travel path extends. The travel path is a path in which the moving object travels.

The axis deviation angle estimation unit is configured to estimate a vertical axis deviation angle from the roadside object information including information on a plurality of the reflection points. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

BRIEF DESCRIPTION OF THE DRAWINGS

In the accompanying drawings:

FIG. 8 is an explanatory diagram showing an arrangement of the guardrail and reflection points on the guardrail in the vertical direction, and the like;

DETAILED DESCRIPTION OF THE PREFERRED EMBODIMENTS

Figure 1:
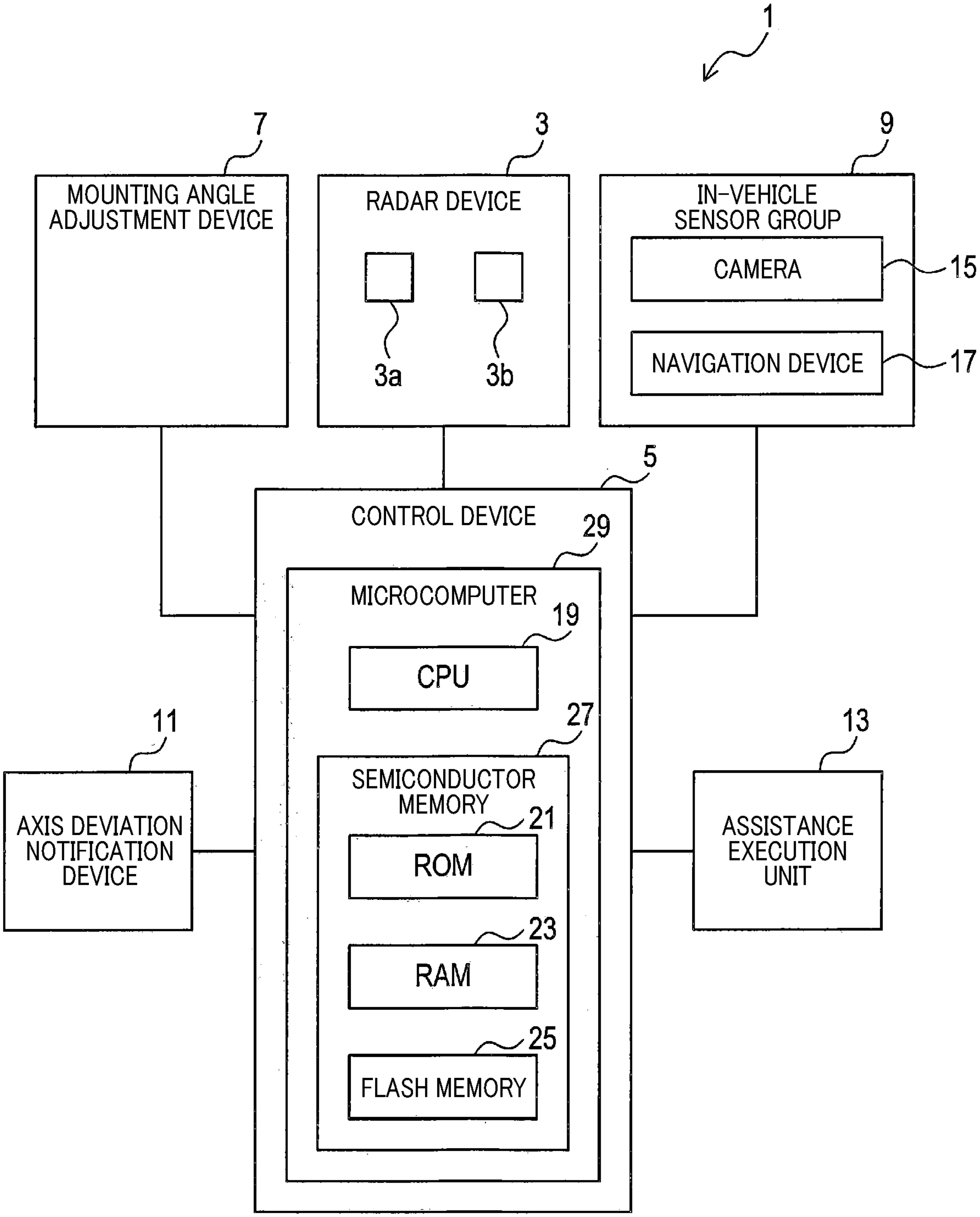
FIG. 1 is a block diagram showing a vehicle control system including an axis deviation estimation device of a first embodiment.

For example, JP 6321448 B discloses a technique for estimating an angle of axis deviation of a radar device in a vertical direction (i.e., vertical axis deviation) using a phenomenon in which the reception intensity of a reflected wave from a road surface near the vehicle is maximum.

As a result of detailed studies on the technique described above, the inventor has found the following improvement point.

The technique described above uses the reception intensity of a reflected wave from the road surface to estimate the angle of vertical axis deviation (i.e., vertical axis deviation angle). Thus, it is not easy to accurately estimate the vertical axis deviation angle when a radar beam is directed upward (i.e., when a sensor is directed upward).

That is, when an upward axis deviation of a radar beam occurs, in some cases, a reflected wave from the road surface cannot be sufficiently received, and in such a case, it is not easy to detect an axis deviation based on the reflected wave.

One or more aspects of the present disclosure preferably provides a technique for accurately estimating a vertical axis deviation angle of a radar device.

An axis deviation estimation device of an aspect of the present disclosure relates to an axis deviation estimation device for estimating an axis deviation of a radar device when the radar device is mounted on a moving object.

The axis deviation estimation device includes an object information acquisition unit, a roadside object extraction unit, and an axis deviation angle estimation unit.

The object information acquisition unit is configured to repeatedly acquire object information including an object distance and an object azimuth angle. The object distance is a distance between the radar device and a reflection object corresponding to a reflection point of a radar wave that is detected by the radar device, and the object azimuth angle is an azimuth angle at which the reflection object is located.

The roadside object extraction unit is configured to extract roadside object information on a roadside object from the object information. Specifically, the roadside object extraction unit is configured to extract the roadside object information from the object information based on a predetermined extraction condition. The roadside object information is information on the reflection point on a roadside object provided in accordance with a predetermined condition on a side of a travel path at a higher position than the travel path in a direction in which the travel path extends. The travel path is a path in which the moving object travels.

The axis deviation angle estimation unit is configured to estimate a vertical axis deviation angle from the roadside object information including information on a plurality of the reflection points. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

In an aspect of the present disclosure, the above configuration makes it possible to easily extract, from object information on a reflection object obtained by driving the radar device, roadside object information such as a position of a roadside object provided along a travel path. The roadside object is provided in accordance with a predetermined condition along the travel path on the side of the travel path at a higher position than the travel path. Thus, for example, even when the direction of a radar beam is deviated upward, a reflected wave from the roadside object is more easily detected than a reflected wave from the road surface.

That is, even when the direction of the radar device is deviated upward, a reflected wave from the roadside object is more easily detected than a reflected wave from the road surface. Furthermore, even when the roadside object is located away from the radar device, a reflected wave from the roadside object can be easily detected.

Thus, in an aspect of the present disclosure, it is possible to accurately estimate a vertical axis deviation of a radar device based on roadside object information obtained by using a reflected wave from a roadside object having such characteristics.

Embodiments of the present disclosure will be described below with reference to the drawings.

1. First Embodiment

1-1. General Configuration

First, a general configuration of a vehicle control system including an axis deviation estimation device of a first embodiment will be described.

A vehicle control system 1 shown in FIG. 1 is a system to be mounted on a vehicle VH which is a moving object. The vehicle control system 1 includes a radar device 3 and a control device 5 as main components. The vehicle control system 1 may further include a mounting angle adjustment device 7, an in-vehicle sensor group 9, an axis deviation notification device 11, and an assistance execution unit 13. Hereinafter, the vehicle VH on which the vehicle control system 1 is mounted is also referred to as the own vehicle VH. Furthermore, a vehicle width direction of the own vehicle VH is also referred to as a horizontal direction, and a vehicle height direction of the own vehicle VH is also referred to as a vertical direction.

Figure 2:
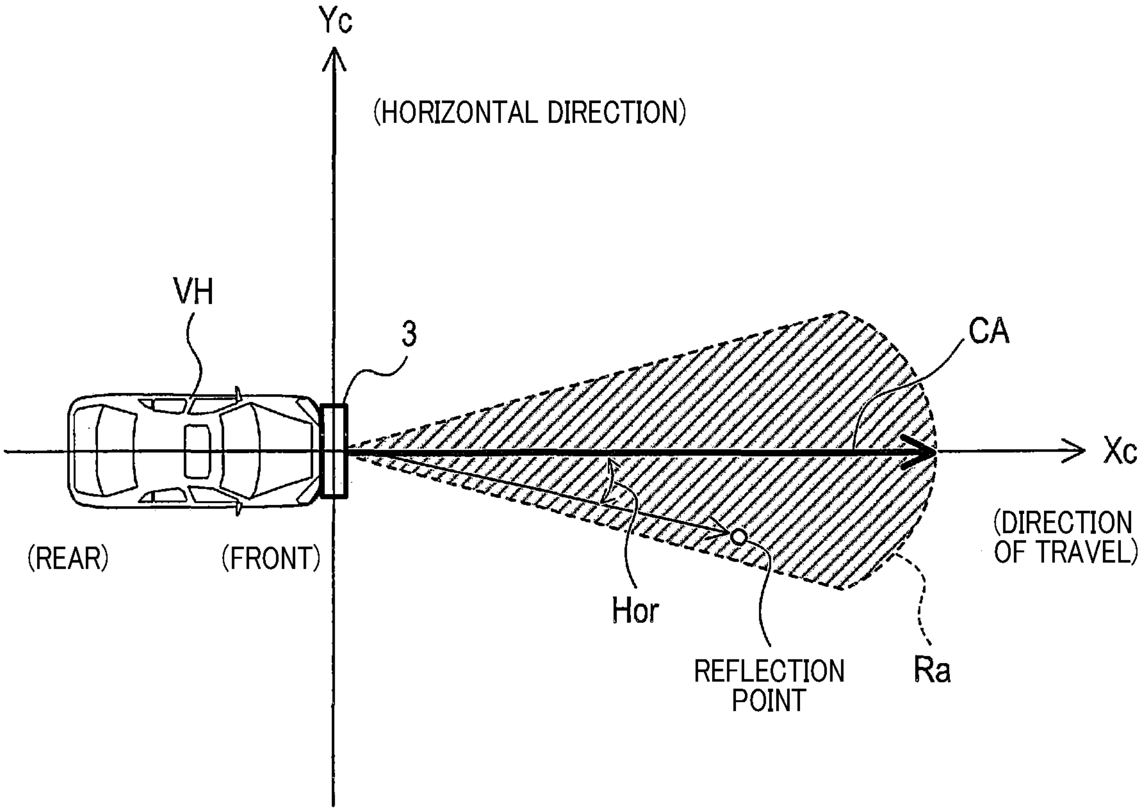
FIG. 2 is an explanatory diagram showing a region irradiated with a radar wave in a horizontal direction.
Figure 3:
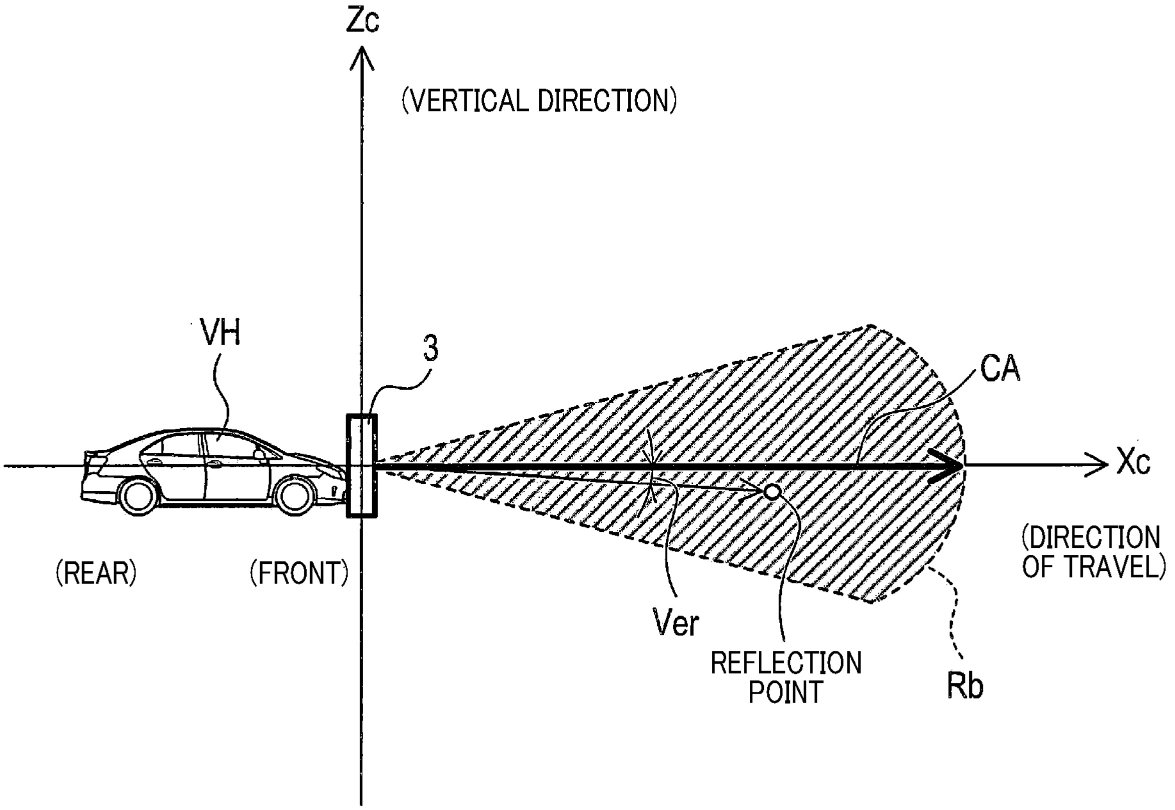
FIG. 3 is an explanatory diagram showing a region irradiated with a radar wave in a vertical direction.

As shown in FIGS. 2 and 3, the radar device 3 is arranged at the front of the own vehicle VH, and emits a radar wave in a forward direction (i.e., direction of travel) of the own vehicle VH. Specifically, the radar device 3 irradiates, with a radar wave, a predetermined angle region Ra in the horizontal direction in front of the own vehicle VH and a predetermined angle region Rb in the vertical direction in front of the own vehicle VH. The radar device 3 receives a reflected wave of the emitted radar wave, and generates reflection point information (i.e., object information) on a reflection point (i.e., reflection object) at which the radar wave is reflected.

The radar device 3 may be a millimeter-wave radar that uses an electromagnetic wave in a millimeter-wave band as a radar wave, a laser radar that uses a laser beam as a radar wave, or a sonar that uses a sound wave as a radar wave. In any case, in the radar device 3, an antenna unit for transmitting and receiving a radar wave is configured to be able to detect the arrival direction of a reflected wave both in the horizontal direction and in the vertical direction. The antenna unit may include array antennas arranged in the horizontal direction and the vertical direction.

The radar device 3 is mounted on the own vehicle VH so that a beam direction of a beam of a radar wave (i.e., radar beam) emitted from the radar device 3 coincides with the forward direction in the longitudinal direction of the own vehicle VH, that is, the direction of travel of the own vehicle VH. The radar device 3 is used to detect various objects (i.e., targets) that are present in front of the own vehicle VH. The beam direction is a direction along a center axis CA of a radar beam. When the radar device 3 is placed at a proper position (i.e., reference position), the beam direction usually coincides with the direction of travel of the own vehicle VH.

The reflection point information generated by the radar device 3 includes at least an azimuth angle of the reflection point, and a distance to the reflection point (i.e., a distance between the radar device 3 and the reflection point). The radar device 3 may be configured to detect a relative speed of the reflection point to the own vehicle VH and a reception intensity (i.e., reception power) of a reflected wave of the radar wave reflected at the reflection point. The reflection point information may include the relative speed of the reflection point and the reception intensity.

As shown in FIGS. 2 and 3, the azimuth angle of the reflection point is an angle obtained by using as a reference the beam direction which is a direction along the center axis CA of the radar beam. Specifically, the azimuth angle of the reflection point is at least one of an angle in the horizontal direction (hereinafter referred to as horizontal angle) Hor at which the reflection point is located and an angle in the vertical direction (hereinafter referred to as vertical angle) Ver at which the reflection point is located. In this case, the reflection point information includes both the vertical angle Ver and the horizontal angle Hor as information indicating the azimuth angle of the reflection point.

The radar device 3 is, for example, an FMCW radar device. The radar device 3 alternately transmits a radar wave in an ascending modulation section and a radar wave in a descending modulation section with a modulation period set in advance, and receives a reflected radar wave. FMCW is an abbreviation for Frequency Modulated Continuous Wave.

For each modulation period, the radar device 3 detects, as the reflection point information, the horizontal angle Hor and the vertical angle Ver which are the azimuth angles of the reflection point, the distance to the reflection point, the relative speed to the reflection point, and the reception intensity of the received radar wave as described above.

The mounting angle adjustment device 7 includes a motor, and a gear attached to the radar device 3. The mounting angle adjustment device 7 rotates the motor based on a driving signal output from the control device 5. This causes a rotational force of the motor to be transmitted to the gear, allowing the radar device 3 to be rotated about a horizontal axis along the horizontal direction and a vertical axis along the vertical direction.

Thus, for example, by rotating the radar device 3 about the horizontal axis in the direction of arrow A (see FIG. 5, for example) along a vertical plane, an angle of deviation of the radar device 3 in the vertical direction can be adjusted.

The in-vehicle sensor group 9 is at least one sensor mounted on the own vehicle VH to detect a state of the own vehicle VH and the like. The in-vehicle sensor group 9 may include a vehicle speed sensor. The vehicle speed sensor is a sensor that detects a speed of the vehicle based on rotation of a wheel. Furthermore, as shown in FIG. 1, the in-vehicle sensor group 9 may include, for example, a camera 15 such as a CCD camera. The camera 15 captures an image of the same region as the region irradiated with a radar wave from the radar device 3.

Furthermore, the in-vehicle sensor group 9 may include an acceleration sensor. The acceleration sensor detects an acceleration of the own vehicle VH. Furthermore, the in-vehicle sensor group 9 may include a yaw rate sensor. The yaw rate sensor detects a rate of change in yaw angle indicating an inclination of the direction of travel of the own vehicle VH with respect to the forward direction of the own vehicle VH. Furthermore, the in-vehicle sensor group 9 may include a steering angle sensor. The steering angle sensor detects a steering angle of a steering wheel.

Furthermore, the in-vehicle sensor group 9 may include a navigation device 17 including map information. The navigation device 17 may be configured to detect a position of the own vehicle VH based on a GPS signal or the like and associate the position of the own vehicle VH with the map information. The map information may include, as various types of information on a road, for example, information on a position at which a vehicle protective fence (hereinafter referred to as guardrail) 41 (see FIG. 7, for example) is provided as a roadside object.

The axis deviation notification device 11 is a voice output device provided in a cabin of the vehicle, and outputs a warning sound to an occupant of the own vehicle VH. The axis deviation notification device 11 may be, for example, an audio device of the assistance execution unit 13.

The assistance execution unit 13 performs a predetermined driving assistance by controlling various in-vehicle devices based on a result of an object detection process (described later) performed by the control device 5. The various in-vehicle devices to be controlled may include a monitor that displays an image, and an audio device that outputs an alarm sound and a guidance voice. Furthermore, a control device that controls an internal combustion engine, a power train mechanism, a brake mechanism, and the like of the own vehicle VH may be included.

The control device 5 includes a microcomputer 29 including a CPU 19, and a semiconductor memory (hereinafter referred to as memory) 27 including a ROM 21, a RAM 23, a flash memory 25, and the like. The CPU 19 executes a program stored in a non-transitory tangible storage medium to implement various functions of the control device 5. In this example, the memory 27 corresponds to the non-transitory tangible storage medium storing a program. When the program is executed, a method corresponding to the program is performed; thus, functions is realized. The control device 5 may include a single microcomputer 29, or may include a plurality of microcomputers 29.

Figure 4:
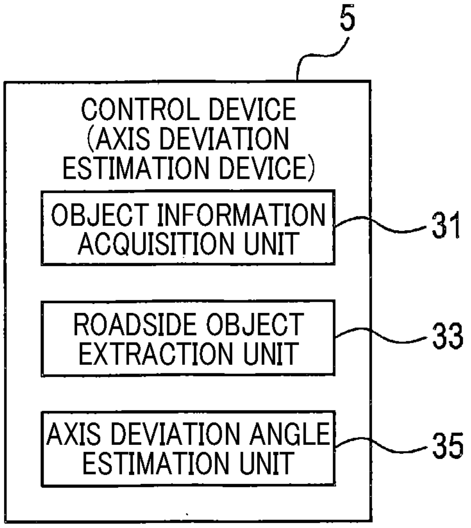
FIG. 4 is a block diagram functionally showing the axis deviation estimation device of the first embodiment.

As shown in FIG. 4, the control device 5 has the functions of an object information acquisition unit 31, a roadside object extraction unit 33, and an axis deviation angle estimation unit 35, and serves as an axis deviation estimation device.

The object information acquisition unit 31 repeatedly acquires reflection point information (i.e., object information) including an azimuth angle of a reflection point (i.e., object azimuth angle) and a distance to the reflection point (i.e., object distance).

The roadside object extraction unit 33 extracts roadside object information from the reflection point information based on a predetermined extraction condition (described later). The roadside object information is information on a reflection point on a roadside object (e.g., the guardrail 41) provided in accordance with a predetermined condition (e.g., provided at a constant height) on the side of a road (i.e., lane) on which the vehicle VH travels, at a higher position than a road surface of the road in a direction in which the road extends. The roadside object information includes, for example, information on a position of the reflection point at which a radar wave is reflected from the roadside object.

The axis deviation angle estimation unit 35 estimates a vertical axis deviation angle from the roadside object information. Specifically, the axis deviation angle estimation unit 35 estimates a vertical axis deviation angle from the roadside object information including information on a plurality of reflection points. The vertical axis deviation angle is an angle of deviation of an actual mounting direction from a reference mounting direction in the vertical direction. The actual mounting direction is an actual direction of the radar device 3, and the reference mounting direction is a direction of the radar device 3 when the radar device 3 is mounted in a reference state (i.e., at a reference position).

In this case, the reference mounting direction is a direction of the radar device 3 when the radar device 3 is placed at the reference position, which is an intended mounting position (i.e., position set in advance) at which the radar device 3 is to be mounted. In the first embodiment, the reference mounting direction coincides with, for example, a direction of the X-axis (i.e., Xc) shown in FIGS. 2 and 3, and no axis deviation of the radar device 3 occurs when the radar device 3 is placed at the reference position. The direction (i.e., reference direction) of the radar device 3 is the front direction of the radar device 3, and the reference mounting direction is the front direction of the vehicle VH.

1-2. Axis Deviation of Radar Device

Next, an axis deviation of the radar device 3 will be described.

An axis deviation of the radar device 3 refers to a deviation of a coordinate axis of the radar device 3 when the radar device 3 is actually mounted on the own vehicle VH from a coordinate axis of the radar device 3 when the radar device 3 is properly mounted on the own vehicle VH.

Axis deviations of the radar device 3 include axis deviations of the radar device 3 around a device coordinate axis and axis deviations of the radar device 3 in the height direction. Of the axis deviations of the radar device 3 around the device coordinate axis, a vertical axis deviation will be mainly described here.

(a) Coordinate Axes

First, coordinate axes of the radar device 3 and coordinate axes of the own vehicle VH will be described.

Figure 5:
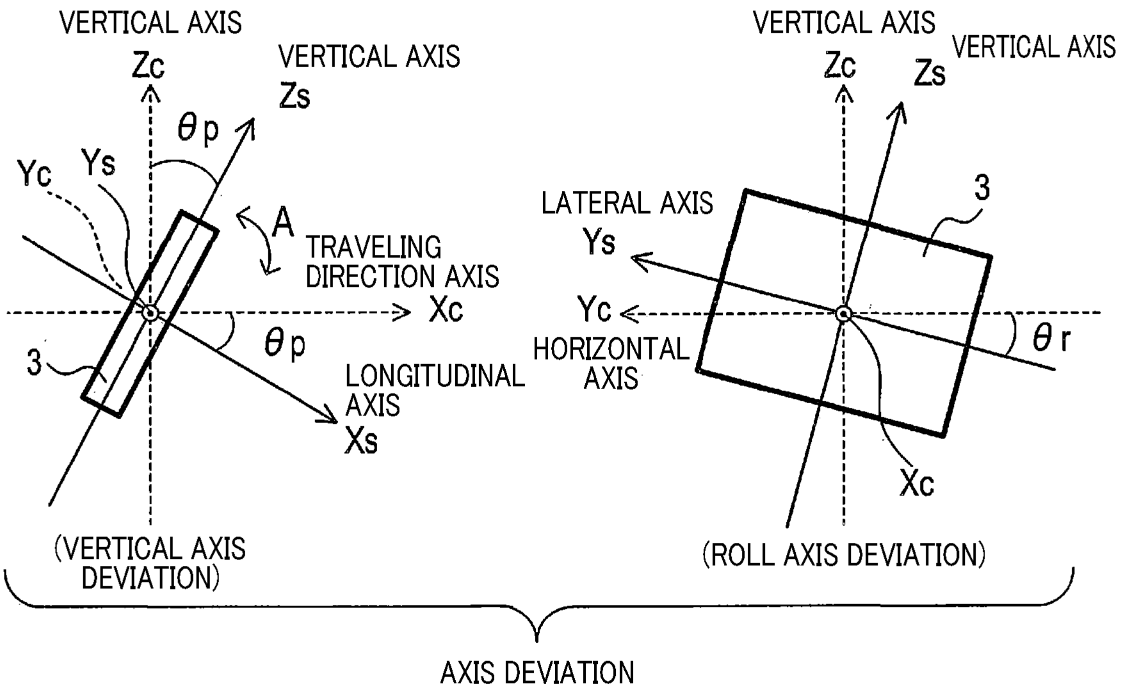
FIG. 5 is an explanatory diagram showing a vertical axis deviation angle and a roll angle.

As shown in FIG. 5, the coordinate axes of the radar device 3 refer to a vertical axis Zs vertically extending from the radar device 3, a lateral axis Ys laterally extending from the radar device 3, and a longitudinal axis Xs longitudinally extending from the radar device 3, when the radar device 3 is mounted on the own vehicle VH. The vertical axis Zs, the lateral axis Ys, and the longitudinal axis Xs are perpendicular to each other. In the first embodiment, in which the radar device 3 is placed at the front of the own vehicle VH, the longitudinal axis Xs coincides with the center axis CA of a radar beam. That is, the direction of the radar device 3 coincides with the direction of the longitudinal axis Xs.

The vertical axis Zs, the lateral axis Ys, and the longitudinal axis Xs constitute coordinates of the radar device 3 (i.e., device coordinates).

On the other hand, the coordinate axes of the own vehicle VH refer to a vertical axis Zc extending in the vertical direction, a horizontal axis Yc extending in the horizontal direction, and a traveling direction axis Xc extending in the direction of travel of the own vehicle VH. The vertical axis Zc, the horizontal axis Yc, and the traveling direction axis Xc are perpendicular to each other.

The vertical axis Zc, the horizontal axis Yc, and the traveling direction axis Xc constitute coordinates of the own vehicle VH (i.e., vehicle coordinates).

In the first embodiment, as described above, when the radar device 3 is properly mounted on the own vehicle VH, the direction of the center axis CA coincides with the direction of travel of the own vehicle VH. That is, the directions of the coordinate axes of the radar device 3 coincide with the respective directions of the coordinate axes of the own vehicle VH. For example, in the own vehicle VH in an initial state such as in the own vehicle VH when shipped from the factory, the radar device 3 is properly mounted on the own vehicle VH, that is, the radar device 3 is mounted at a predetermined position.

(b) Axis Deviation Around Device Coordinate Axis

Next, an axis deviation of the radar device 3 around the device coordinate axis will be described.

In the own vehicle VH after the initial state, an axis deviation of the radar device 3 around the device coordinate axis may occur. Such axis deviations include a vertical axis deviation and a roll axis deviation. An axis deviation angle is an angle indicating the magnitude of such an axis deviation.

Of these, as shown on the left side of FIG. 5, a vertical axis deviation refers to a deviation between the vertical axis Zs as the coordinate axis of the radar device 3 and the vertical axis Zc as the coordinate axis of the own vehicle VH. An axis deviation angle of such vertical axis deviation is referred to as a vertical axis deviation angle θp. The vertical axis deviation angle θp is a pitch angle θp, and is an axis deviation angle of deviation of the coordinate axis of the radar device 3 around the horizontal axis Yc of the own vehicle VH. Thus, the vertical axis deviation angle θp is an axis deviation angle of axis deviation around the horizontal axis Yc of the own vehicle VH, that is, around the lateral axis Ys of the radar device 3.

As is clear from the left side of FIG. 5, the vertical axis deviation angle θp can also be an angle indicating the magnitude of a deviation between the longitudinal axis Xs as the coordinate axis of the radar device 3 and the traveling direction axis Xc as the coordinate axis of the own vehicle VH.

The vertical axis deviation angle will be described below in more detail with reference to FIG. 6.

Figure 6:
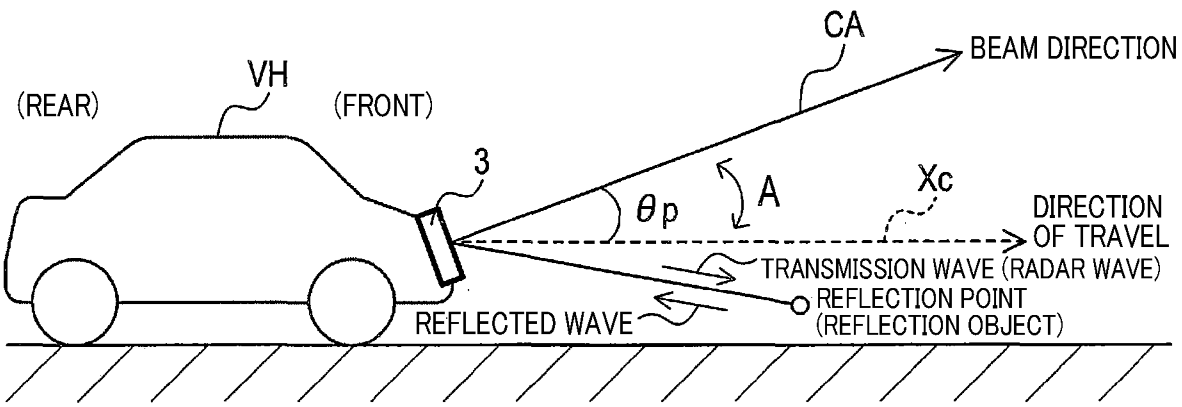
FIG. 6 is an explanatory diagram showing an axis deviation of a radar device.

FIG. 6 shows an axis deviation (i.e., an axis deviation in the vertical direction) of a radar beam of the radar device 3 in a Z-X plane which is a vertical plane passing through the traveling direction axis Xc. When there is no axis deviation, the center axis CA of the radar beam coincides with the traveling direction axis Xc.

As shown in FIG. 6, the vertical axis deviation angle θp is an angle in the vertical direction between the direction of travel of the vehicle VH and the beam direction when the reference mounting direction of the radar device 3 coincides with the direction of travel of the vehicle VH, and the actual mounting direction of the radar device 3, which is the actual direction of the radar device 3, is the beam direction.

That is, the vertical axis deviation angle θp is an angle of deviation of the center axis CA of the radar beam of the radar device 3 from the direction of travel as a reference to the actual beam direction shown in FIG. 6 that is caused, for example, by rotation of the radar device 3 in the direction of arrow A.

As shown on the right side of FIG. 5, a roll axis deviation refers to a deviation between the lateral axis Ys as the coordinate axis of the radar device 3 and the horizontal axis Yc as the coordinate axis of the own vehicle VH. An axis deviation angle of such roll axis deviation is referred to as a roll angle θr.

1-3. Principle

Next, a principle of estimation of the vertical axis deviation angle using a roadside object as in the first embodiment will be described.

Figure 7:
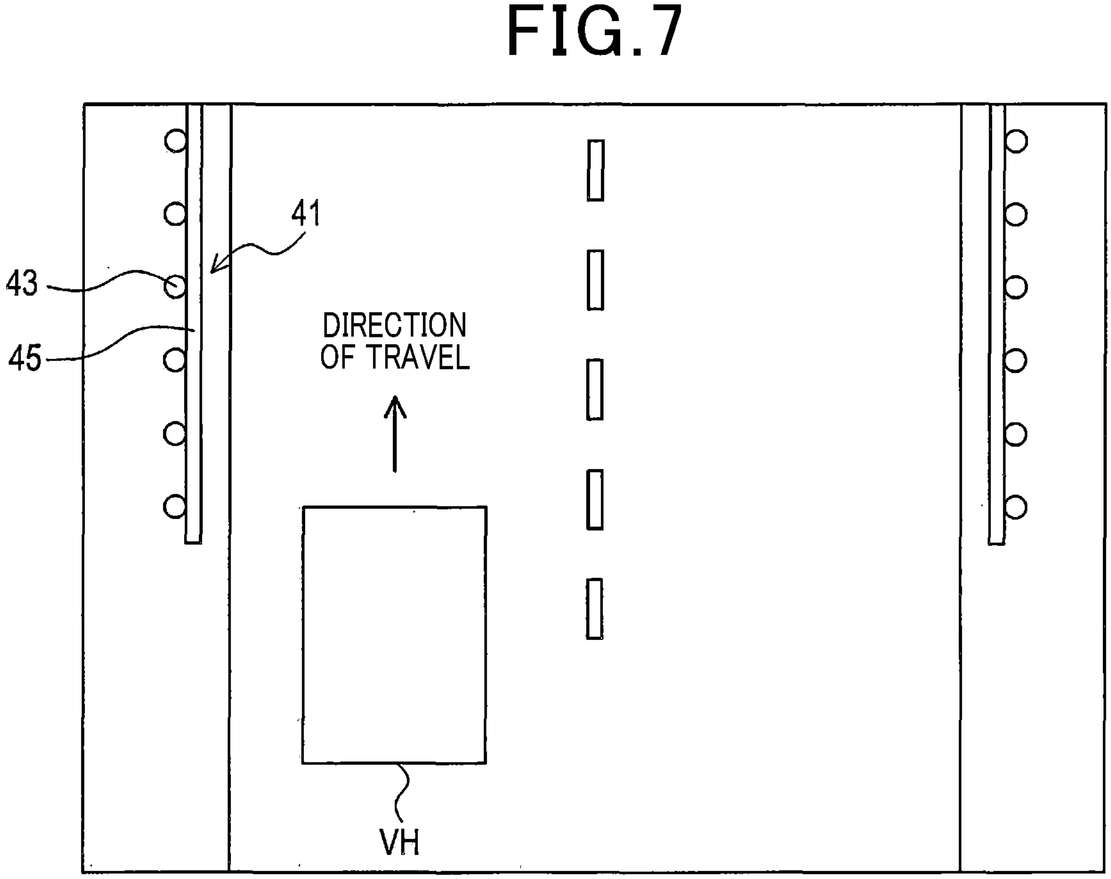
FIG. 7 is an explanatory diagram showing an arrangement of a guardrail and the like on a road in a plane.
Figure 8:
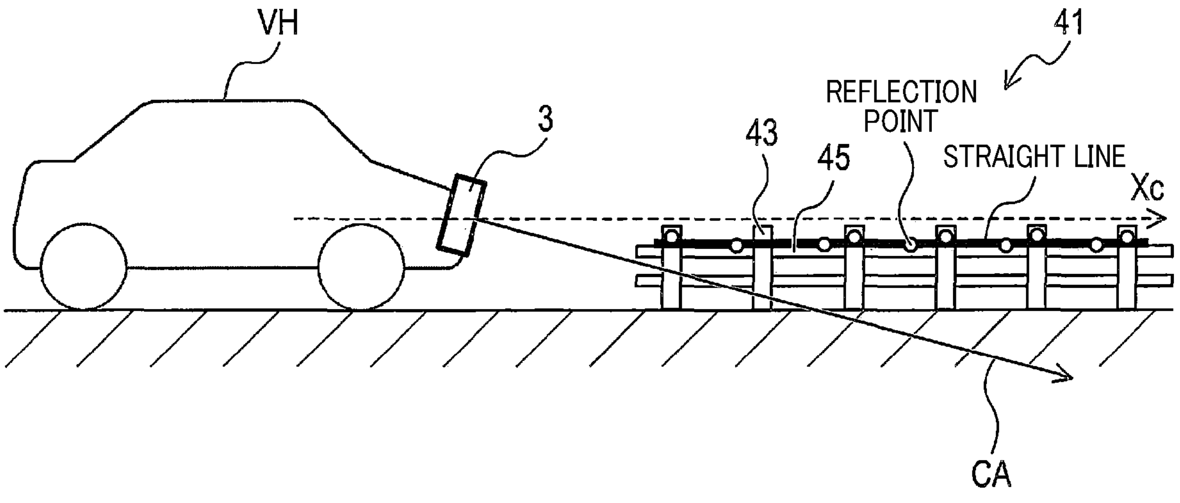

(a) For example, as shown in FIGS. 7 and 8, an example will be described in which the guardrail 41 is provided as a roadside object on the side of a road in a width direction of the road so as to protrude upward from the road surface in a direction in which the road extends. The lateral direction in FIG. 7 indicates the width direction of the road, and the vertical direction in FIG. 7 indicates the direction in which the road extends, that is, the direction in which the vehicle VH travels.

In such a case, as shown in FIG. 8, the guardrail 41 is usually provided at a constant height in the direction in which the road extends. Specifically, on the road surface, a plurality of poles 43 are arranged in a line in the direction in which the road extends, and a bar-shaped or plate-shaped lateral member 45 is fixed to laterally connect the poles 43 (e.g., adjacent poles 43).

That is, the poles 43 and the lateral member 45 are usually provided at a constant height; thus, the upper end of the guardrail 41 extends substantially horizontally along the road. The entire guardrail 41 on the road surface also extends substantially horizontally in a strip shape (i.e., with a predetermined vertical width) in the vertical plane.

Thus, when a radar beam is emitted forward from the radar device 3 of the vehicle VH, the radar beam is reflected from the road surface or the guardrail 41, and a reflected wave of the radar beam is received by the radar device 3. Then, based on the reflected wave, the road surface or the guardrail 41 is detected as a reflection point (i.e., reflection object).

When a radar beam is actually emitted from the radar device 3 to the guardrail 41 and a reflected wave of the radar beam is examined, a reflected wave from the upper ends of the poles 43 and the upper end of the lateral member 45 has a high intensity, and this makes it possible to easily detect a reflection point at the upper ends of the poles 43 and the upper end of the lateral member 45. Furthermore, a reflection point can also be detected at a portion of the guardrail 41 other than the upper ends of the poles 43 and the upper end of the lateral member 45.

Thus, when the guardrail 41 is provided along the road, a large number of reflection points corresponding to the guardrail 41 are detected in a strip-shaped region in the direction of travel of the vehicle VH. In particular, reflection points corresponding to the upper ends of the poles 43 and the upper end of the lateral member 45 are detected in a substantially linear region having a small width.

As described in detail later, therefore, the arrangement of a large number of reflection points (i.e., reflection point group) corresponding to the guardrail 41 that are detected in the strip-shaped region makes it possible to determine a slope of the reflection point group when there is a vertical axis deviation.

In FIG. 8, for easy understanding, the arrangement of the reflection point group is indicated by the straight line connecting the reflection points at the upper ends of the poles 43 and the upper end of the lateral member 45.

(b) Next, a relationship between the vertical axis deviation angle θp and a reflection point group will be described with reference to FIG. 9.

Figure 9:
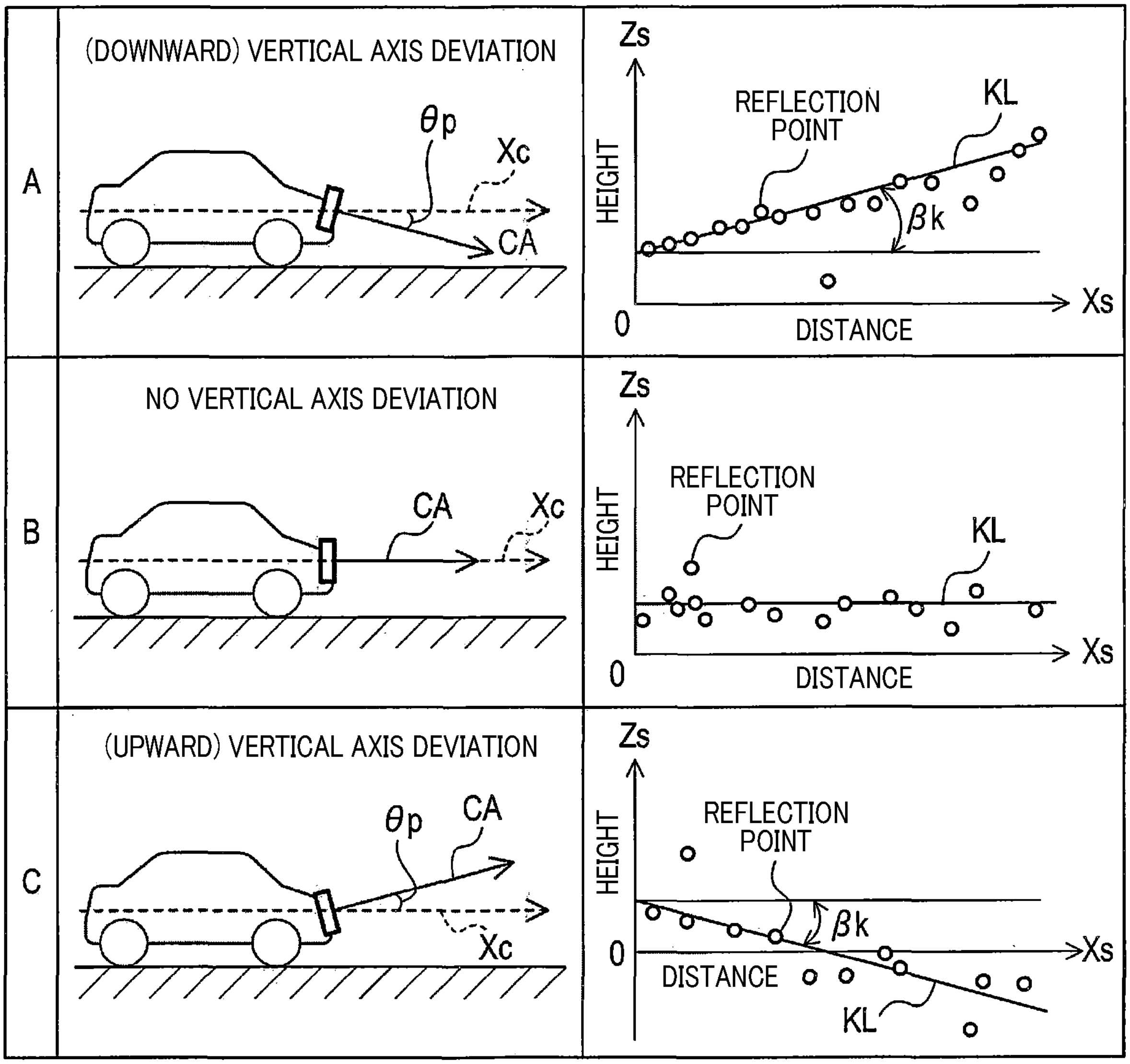
FIG. 9 is an explanatory diagram showing relationships between the vertical axis deviation angle, an arrangement of reflection points, and an approximate straight line.

As shown in FIG. 9 (B), when there is no vertical axis deviation of the radar device 3 (i.e., when the center axis CA is horizontal), as shown in the graph on the right side of FIG. 9 (B), a plurality of reflection points detected by the radar device 3 are arranged substantially horizontally in the vertical plane.

The graphs on the right side of FIG. 9 show positions of reflection points obtained by projecting reflection points in the three-dimensional device coordinates along the lateral axis Ys onto the Z-X plane (i.e., positions of projected reflection points). The straight line in each of the graphs is an approximate straight line KL obtained by approximating the plurality of projected reflection points using a least-squares method. Hereinafter, a projected reflection point may be simply referred to as a reflection point.

Thus, when a result of detection by the radar device 3 indicates that the approximate straight line KL is horizontal as shown in the graph on the right side of FIG. 9 (B), it can be determined that there is no vertical axis deviation.

However, if, as shown in FIG. 9 (A), the center axis CA of the radar beam of the radar device 3 (i.e., the direction of the radar device 3) is deviated downward, a portion of the center axis CA of the radar beam that is located farther from the radar device 3 in the traveling direction Xc is located farther from the upper ends of the poles 43.

FIG. 8 shows that when the center axis CA of the radar beam is deviated downward from the traveling direction axis Xc, a distance between the center axis CA and the upper end of the guardrail 41 is increased in a direction away from the radar device 3 toward the right side of FIG. 8.

Thus, as shown in the graph on the right side of FIG. 9 (A), in the arrangement of the plurality of reflection points, a reflection point located farther from the radar device 3 and closer to the right side of FIG. 9 (A) is located at a higher position; thus, a slope β of the approximate straight line KL has a positive value. As the absolute value of the slope β of the approximate straight line KL is increased, the absolute value of the vertical axis deviation angle θp of downward deviation of the radar device 3 is increased. That is, as is clear from FIG. 9 (A) and the like, an angle corresponding to the slope β of the approximate straight line KL (i.e., slope angle βk) and the vertical axis deviation angle θp of the radar device 3 have the same absolute value and opposite signs.

Thus, when a result of detection by the radar device 3 provides the slope β of the approximate straight line KL as shown in the graph on the right side of FIG. 9 (A) (i.e., the slope β having a positive value), it can be determined that there is a downward vertical axis deviation at the vertical axis deviation angle θp corresponding to the slope β. In this case, the slope angle βk has a positive value, and the vertical axis deviation angle θp has a negative value.

On the other hand, if, as shown in FIG. 9 (C), the direction of the radar device 3 is deviated upward, in the arrangement of the reflection points, as shown in the graph on the right side of FIG. 9 (C), a reflection point located farther from the radar device 3 in the direction of travel (i.e., located closer to the right side of FIG. 9 (C)) is located at a lower position. In this case, the slope β of the approximate straight line KL has a negative value in the device coordinates.

Thus, when a result of detection by the radar device 3 provides the slope β of the approximate straight line KL as shown in the graph on the right side of FIG. 9 (C) (i.e., the slope β having a negative value), it can be determined that there is an upward vertical axis deviation at the vertical axis deviation angle θp corresponding to the slope β. In this case, the slope angle βk has a negative value, and the vertical axis deviation angle θp has a positive value.

As described above, the angle of axis deviation of the radar device 3 in the vertical direction, that is, the vertical axis deviation angle θp of the radar device 3, can be obtained by using the slope of the reflection points located in the Z-X plane, that is, the slope β of the approximate straight line KL.

1-4. Processes

Next, processes performed by the control device will be described.

(a) Main Routine of Axis Deviation Estimation Process

First, the entire axis deviation estimation process (i.e., main routine) performed by the control device 5 will be described with reference to a flow chart in FIG. 10.

The axis deviation estimation process is a process for estimating the vertical axis deviation angle θp, and is started in response to turning on of an ignition switch.

When this process is started, in step (hereinafter referred to as S) 100, the control device 5 uses the radar device 3 to perform a process of detecting an object in front of the own vehicle VH. The process of detecting an object is called a target detection process, and is a known process as described, for example, in JP 6321448 B mentioned above and the like, and thus will not be described in detail.

In this case, an object (i.e., target) corresponds to a reflection point indicated by reflection point information, and at this stage, the reflection point includes not only a road surface but also a roadside object such as the guardrail 41.

Specifically, in S100, reflection point information is acquired from the radar device 3. The reflection point information is information on each of a plurality of reflection points detected by the radar device 3 mounted on the own vehicle VH. The reflection point information includes at least a horizontal angle and a vertical angle as azimuth angles of the reflection point, and a distance between the radar device 3 and the reflection point. The control device 5 acquires various detection results including an own vehicle speed Cm from the in-vehicle sensor group 9.

In subsequent S110, a roadside object candidate point extraction process is performed. As described in detail later, the roadside object candidate point extraction process is a process for extracting a reflection point as a candidate for a roadside object (i.e., roadside object candidate point) from a large number of reflection points obtained by the radar device 3.

In subsequent S120, a roadside object point group extraction process is performed. As described in detail later, the roadside object point group extraction process is a process for further extracting a point group that is highly likely to be a roadside object (i.e., roadside object point group) from the plurality of roadside object candidate points obtained in S110.

In subsequent S130, a vertical axis deviation angle estimation process is performed. As described in detail later, the vertical axis deviation angle estimation process is a process for estimating the vertical axis deviation angle θp of the radar device 3 from the roadside object point group obtained in S120.

In subsequent S140, it is determined whether the vertical axis deviation angle θp estimated in S130 needs to be adjusted by the mounting angle adjustment device 7. In this step, in response to an affirmative determination, control proceeds to S150, and in response to a negative determination, control proceeds to S180.

Specifically, in response to a determination that the vertical axis deviation angle θp of the radar device 3 is a predetermined threshold angle or more, it is determined that the vertical axis deviation angle θp needs to be adjusted and control proceeds to S150. On the other hand, in response to a determination that the vertical axis deviation angle θp is less than the threshold angle, control proceeds to S180.

In S150, it is determined whether the vertical axis deviation angle θp is in an adjustable range that can be adjusted by the mounting angle adjustment device 7. In this step, in response to an affirmative determination, control proceeds to S170, and in response to a negative determination, control proceeds to S160.

In S170, since the vertical axis deviation angle θp is in the adjustable range, an axis deviation adjustment process is performed. Thus, the mounting angle adjustment device 7 is controlled to adjust the vertical axis deviation angle θp to be zero.

Specifically, the vertical axis deviation angle θp is adjusted by rotating the radar device 3 about the lateral axis Ys of the radar device 3 by the vertical axis deviation angle θp to cause the direction of the radar device 3 to be the reference mounting direction, and control proceeds to S180.

On the other hand, in S160, since the vertical axis deviation angle θp is not in the adjustable range, no adjustment of the vertical axis deviation angle θp is performed, and diagnosis information indicating that there is an axis deviation of the radar device 3 (i.e., axis deviation diagnosis) is output to the axis deviation notification device 11, and control proceeds to S180. The axis deviation notification device 11 may output a warning sound based on the axis deviation diagnosis.

In S180, it is determined whether to end the process, for example, based on a determination of whether the ignition switch is turned off. In this step, in response to an affirmative determination, the process is temporarily ended, and in response to a negative determination, control returns to S100.

(b) Roadside Object Candidate Point Extraction Process

Next, the roadside object candidate point extraction process performed by the control device 5 will be described with reference to a flow chart in FIG. 11.

Figure 10:
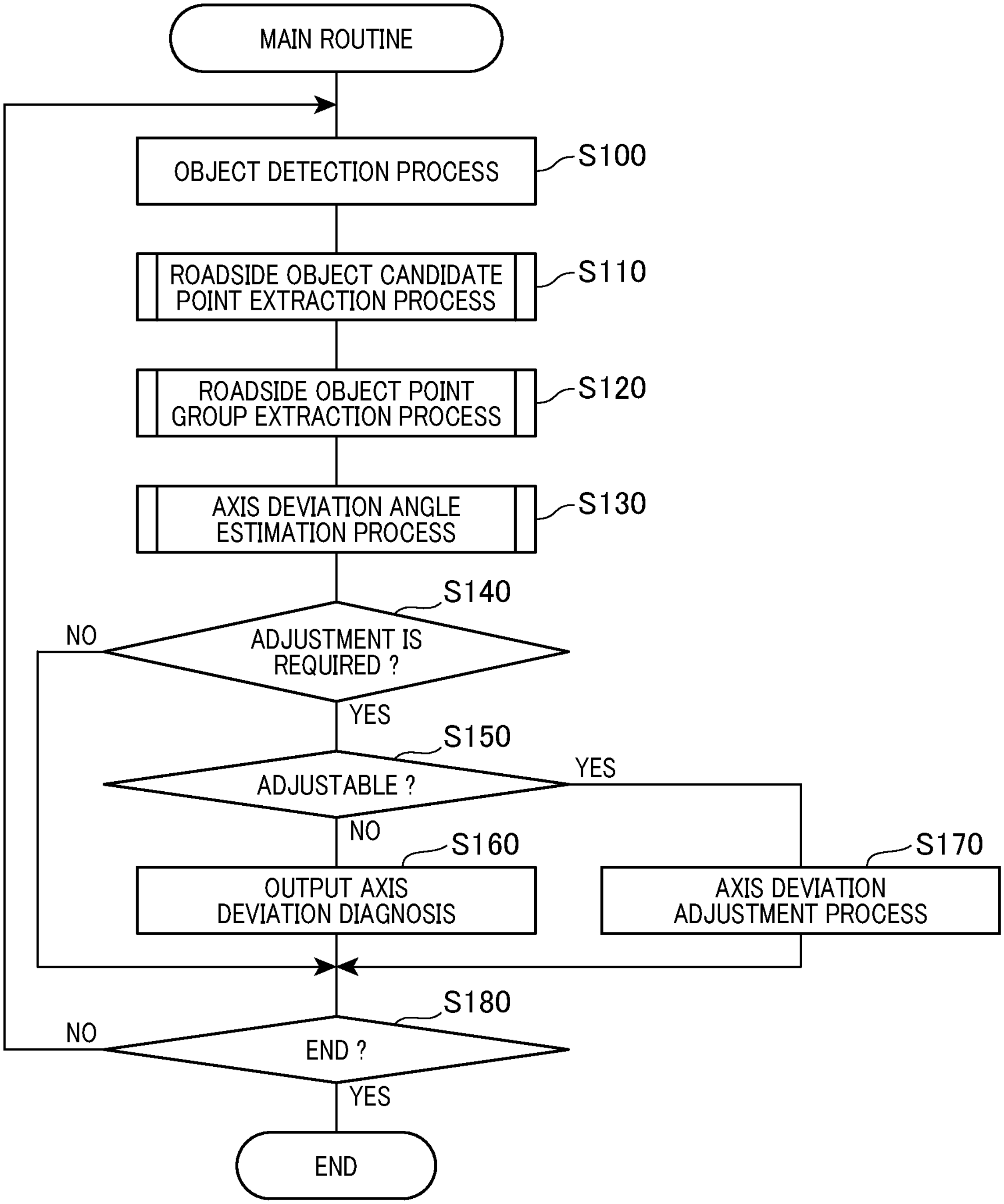
FIG. 10 is a flow chart showing a main routine of an axis deviation estimation process.

This process is the process in S110 shown in FIG. 10, and is a process for extracting a reflection point as a candidate for a roadside object (i.e., roadside object candidate point) from a large number of reflection points obtained by the radar device 3. The reflection point extracted as a candidate in this process is a point that is probable as a reflection point on the guardrail 41 described above.

The guardrail 41 will be described below as an example of a roadside object, and the guardrail 41 may be hereinafter simply referred to as a roadside object.

Figure 11:
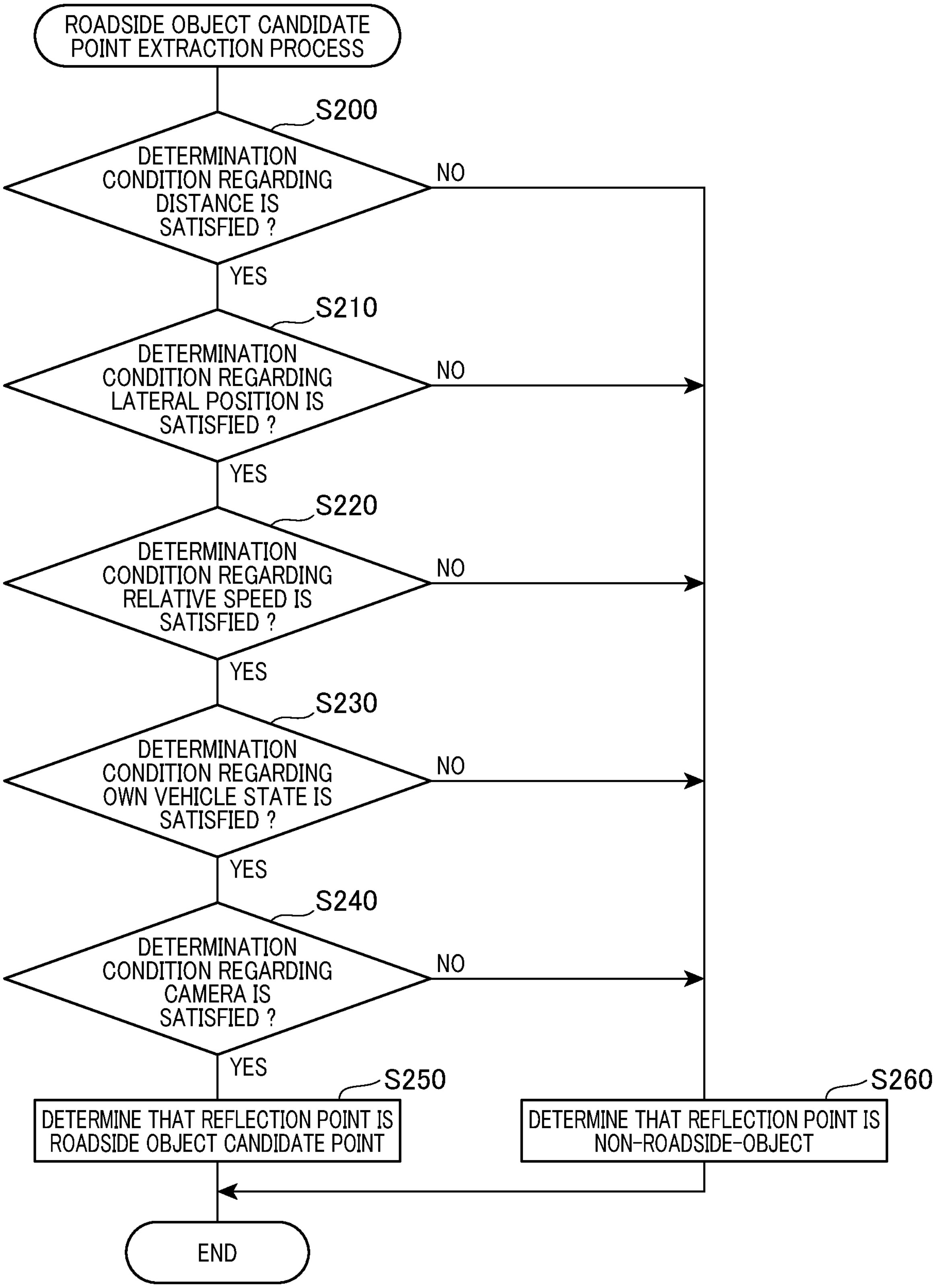
FIG. 11 is a flow chart showing a roadside object candidate point extraction process.

First, in S200 shown in FIG. 11, it is determined whether a "determination condition regarding the distance" is satisfied. In this step, in response to an affirmative determination, control proceeds to S210, and in response to a negative determination, control proceeds to S260.

For example, it is determined whether a reflection point as a determination target in the direction of travel of the own vehicle VH satisfies a "condition that the reflection point is located in a region at a distance greater than 2 m and less than 100 m from the own vehicle VH".

In S210, it is determined whether a "determination condition regarding the lateral position" is satisfied. In this step, in response to an affirmative determination, control proceeds to S220, and in response to a negative determination, control proceeds to S260.

For example, it is determined whether the reflection point satisfies a "condition that when the own vehicle VH travels on a left-hand traffic road (e.g., a two-lane road), the reflection point is located in a region at a distance greater than 2 m and less than 8 m from the own vehicle VH on the left side of the own vehicle VH in the direction of travel".

For example, when the own vehicle VH travels on a single-lane road, it may be determined whether the reflection point is located in a region at a distance greater than 2 m and less than 8 m from the own vehicle VH on the right side of the own vehicle VH.

That is, in S210, it is determined whether the reflection point is located, in the lateral direction of the own vehicle VH, in a region in which the guardrail 41 as a roadside object is highly likely to be located.

In S220, it is determined whether a "determination condition regarding the relative speed" is satisfied. In this step, in response to an affirmative determination, control proceeds to S230, and in response to a negative determination, control proceeds to S260.

Specifically, since the guardrail 41 is a stationary object, in this case, it is determined whether the reflection point satisfies a "condition that the speed (i.e., relative speed) of the reflection point with respect to the own vehicle VH corresponds to the speed of the own vehicle VH (i.e., own vehicle speed Cm) for a stationary object". When the own vehicle speed Cm has a positive value, the detected relative speed has a negative value.

The determination on the relative speed can be performed by determining whether the absolute value of the relative speed is within a predetermined margin of error of +A from the absolute value of the own vehicle speed Cm.

In S230, it is determined whether a "determination condition regarding the traveling state of the own vehicle VH (i.e., own vehicle state)" is satisfied. In this step, in response to an affirmative determination, control proceeds to S240, and in response to a negative determination, control proceeds to S260.

For example, when the own vehicle VH is traveling in a straight line or the acceleration of the own vehicle VH is constant, the accuracy in detection of a reflection point is presumably high; thus, in this case, it is determined, based on information from the in-vehicle sensor group 9, whether the own vehicle state is a stable state in which the own vehicle VH travels in a steady state.

For example, it may be determined that the own vehicle VH is traveling in a straight line in the case where during traveling of the own vehicle VH, the yaw angle detected by the yaw rate sensor or the steering angle of the steering wheel detected by the steering angle sensor is a predetermined value or less. Furthermore, it may be determined that the acceleration of the own vehicle VH is constant in the case where the acceleration detected by the acceleration sensor is a predetermined value or less.

When the detection value used for the above determination is within a predetermined margin of error, it may be determined that the own vehicle VH is traveling in a straight line or that the acceleration of the own vehicle VH is constant.

In S240, it is determined whether a "determination condition regarding the camera 15" is satisfied. In this step, in response to an affirmative determination, control proceeds to S250, and in response to a negative determination, control proceeds to S260.

For example, the determination may be performed by processing an image captured by the camera 15 using a known image processing method, and determining from the image whether an object located at a position of the reflection point in the image is highly likely to be the guardrail 41. The method of detecting the guardrail 41 from the image captured by the camera 15 is a known method as described, for example, in JP 2011-118753 A and the like.

In S250, since an affirmative determination has been made for the reflection point as a determination target in all the steps S200 to S240, the reflection point is stored in the memory 27 as a roadside object candidate point that is highly likely to be a reflection point on the guardrail 41, and the process is temporarily ended.

On the other hand, in S260, since a negative determination has been made in any of the steps S200 to S240, the reflection point is stored in the memory 27 as a non-roadside-object that is unlikely to be the guardrail 41, and the process is temporarily ended.

The processes in S200 to S260 described above are performed for all the reflection points obtained by performing the object detection process; thus, all the reflection points are classified as a roadside object candidate point or a non-roadside-object.

(c) Roadside Object Point Group Extraction Process

Next, the roadside object point group extraction process performed by the control device 5 will be described with reference to a flow chart in FIG. 12.

This process is the process in S120 shown in FIG. 10, and is a process for extracting, from the plurality of roadside object candidate points obtained by performing the roadside object candidate point extraction process in FIG. 11, a roadside object point group used to calculate the vertical axis deviation angle θp. A roadside object point group is composed of a plurality of reflection points.

Figure 12:
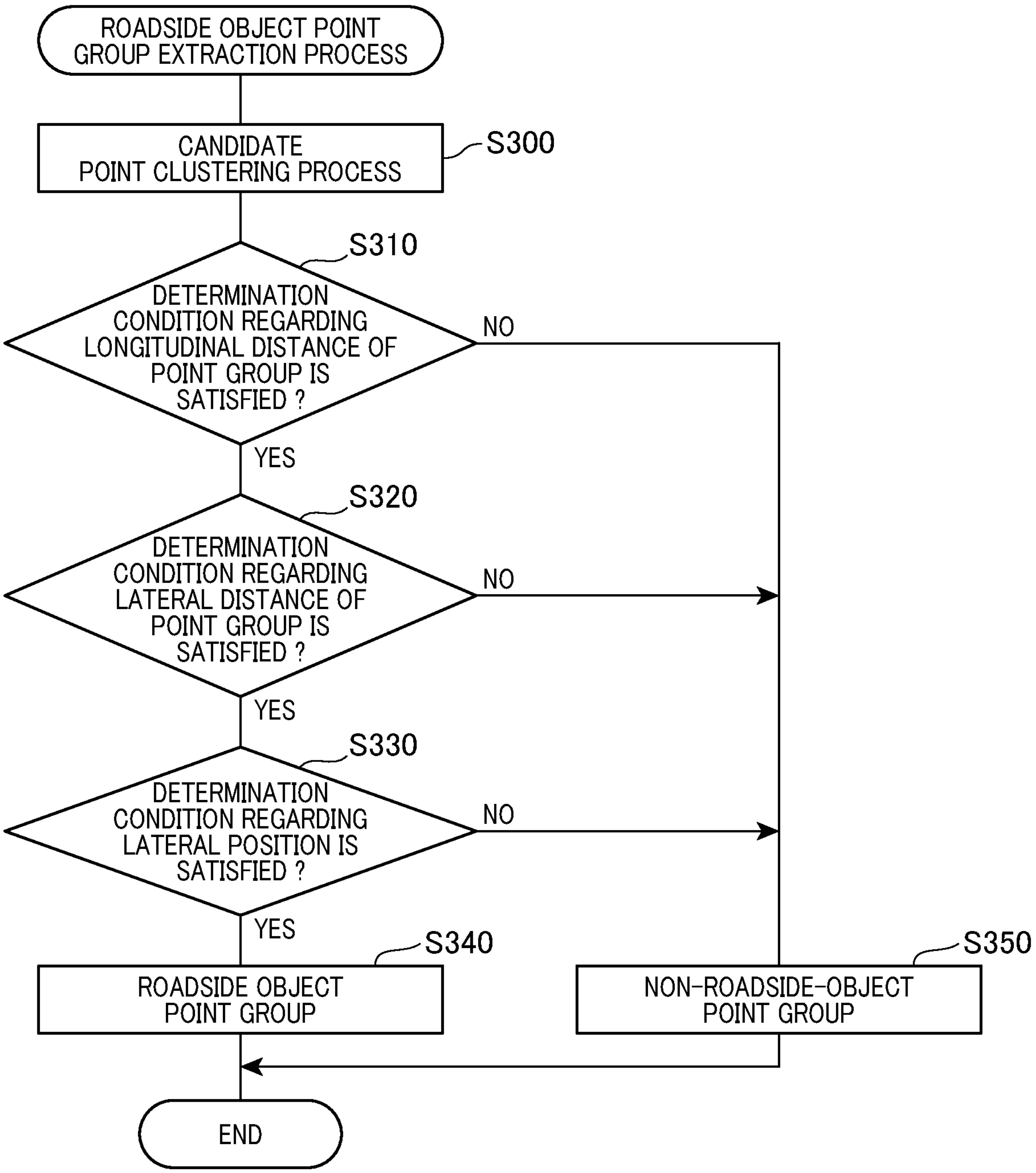
FIG. 12 is a flow chart showing a roadside object point group extraction process.

First, in S300 shown in FIG. 12, a candidate point clustering process is performed. That is, clustering (i.e., classification) of the plurality of roadside object candidate points is performed.

For example, the plurality of reflection points as the plurality of roadside object candidate points are divided into a plurality of (e.g., 6) clusters using a known k-means method or the like. Although each reflection point is three-dimensional data with the XYZ coordinates in the vehicle coordinates, the XY coordinates of the reflection point are used for clustering.

In subsequent S310, it is determined whether a "determination condition regarding the longitudinal distance of the roadside object point group (i.e., point group)" is satisfied. In this step, in response to an affirmative determination, control proceeds to S320, and in response to a negative determination, control proceeds to S350.

That is, for all the roadside object candidate points (i.e., roadside object point group) in each of the clusters into which the roadside object candidate points are divided, it is determined whether the determination condition regarding the longitudinal distance is satisfied.

Specifically, for example, for the roadside object point group corresponding to each cluster, that is, for all the reflection points of the roadside object point group, it is determined whether the length of the roadside object point group in the depth direction which is the direction of travel of the own vehicle VH exceeds a certain range. That is, for all the reflection points in each cluster as a determination target, it is determined whether a value obtained by subtracting a distance in the depth direction between the own vehicle VH and the reflection point closest to the own vehicle VH (i.e., the minimum value) from a distance in the depth direction between the own vehicle VH and the reflection point farthest from the own vehicle VH (i.e., the maximum value) exceeds a predetermined threshold.

The determination in S310 makes it possible to extract, from all the clusters, a cluster that satisfies the determination condition regarding the longitudinal distance of the point group. That is, it is possible to extract, from all the clusters, a cluster in which the reflection points satisfy the determination condition regarding the longitudinal distance of the point group.

In this case, it is determined that a cluster satisfies the determination condition regarding the longitudinal distance when all the reflection points in the cluster satisfy the distance condition described above. However, it may be determined that a cluster satisfies the determination condition regarding the longitudinal distance when a predetermined ratio or more of the reflection points in the cluster satisfy the distance condition described above. This also applies to the following determination condition.

In S320, it is determined whether a "determination condition regarding the lateral distance of the point group" is satisfied. In this step, in response to an affirmative determination, control proceeds to S330, and in response to a negative determination, control proceeds to S350.

That is, for all the reflection points of the roadside object point group of the cluster for which an affirmative determination has been made in S310, it is determined whether the determination condition regarding the lateral distance is satisfied.

Specifically, for example, for all the reflection points of the roadside object point group in the cluster, it is determined whether the length of the roadside object point group in the width direction which is the lateral direction of the own vehicle VH exceeds a certain range. That is, for all the reflection points, it is determined whether a value obtained by subtracting a distance in the width direction between the own vehicle VH and the reflection point closest to the own vehicle VH (i.e., the minimum value) from a distance in the width direction between the own vehicle VH and the reflection point farthest from the own vehicle VH (i.e., the maximum value) exceeds a predetermined threshold.

The determination in S320 makes it possible to further extract, from the clusters that satisfy the determination condition regarding the longitudinal distance of the point group, a cluster that satisfies the determination condition regarding the lateral distance of the point group.

In S330, it is determined whether a "determination condition regarding the lateral position" is satisfied. In this step, in response to an affirmative determination, control proceeds to S340, and in response to a negative determination, control proceeds to S350.

That is, for the cluster for which an affirmative determination has been made in S320, it is determined whether the determination condition regarding the lateral position is satisfied.

Specifically, it is determined whether the point group of the cluster as a determination target is located at the innermost position in the lateral direction of the own vehicle VH. Thus, the point group located at the innermost position is selected.

For example, assuming that a position on the right side of the own vehicle has a positive value in the left-hand traffic, it is determined whether the lateral position of the point group has a positive value (i.e., the point group is located on the right side of the own vehicle) and is closest to the own vehicle.

Furthermore, assuming that a position on the right side of the own vehicle has a positive value in the left-hand traffic, it is determined whether the lateral position of the point group has a negative value (i.e., the point group is located on the left side of the own vehicle) and is closest to the own vehicle.

In S340, since an affirmative determination has been made in all the steps S310 to S330, the selected point group of the cluster is determined as a point group that indicates reflection points on a roadside object (i.e., roadside object point group), and is stored in the memory 27, and then the process is temporarily ended.

On the other hand, in S350, since a negative determination has been made in any of the steps S310 to S330, the point group of the cluster for which a negative determination has been made is determined as a point group that does not indicate a reflection point on a roadside object (i.e., non-roadside-object point group), and the process is temporarily ended.

The determination processes in S310 to S330 are performed to extract a reflection point that is probable as a roadside object such as the guardrail 41.

(d) Vertical Axis Deviation Angle Estimation Process

Next, the vertical axis deviation angle estimation process performed by the control device. 5 will be described with reference to a flow chart in FIG. 13.

This process is the process in S130 shown in FIG. 10, and is a process for calculating the vertical axis deviation angle θp from the roadside object point group (i.e., reflection point group) obtained by performing the roadside object point group extraction process in FIG. 12.

First, in S400, for each roadside object point (i.e., a reflection point corresponding to each roadside object point) of the roadside object point group obtained by performing the roadside object point group extraction process, coordinates of a position of the roadside object point (i.e., device coordinates) are calculated based on the distance and the azimuth angle included in the reflection point information corresponding to the roadside object point.

The device coordinates are three-dimensional coordinates based on the coordinate axes of the radar device 3, that is, the coordinates (Xs, Ys, Zs). The reflection point information is obtained by performing the object detection process in FIG. 10.

That is, for all the roadside object points (i.e., reflection points) of the roadside object point group, the control device 5 calculates the coordinates (Xs, Ys, Zs) as the device coordinates, and stores the coordinates in the memory 27.

In subsequent S410, it is determined whether each roadside object point satisfies a determination condition regarding variation in position of the roadside object point of the roadside object point group (i.e., roadside object position). In this step, in response to an affirmative determination, the process is temporarily ended, and in response to a negative determination, control proceeds to S420.

The determination condition regarding the variation is a condition for determining whether in the Z-X plane of the device coordinates, the position of a roadside object point group (i.e., a plurality of reflection points) varies to such a degree that it is difficult to approximate the plurality of reflection points by the approximate straight line KL described above (i.e., whether the degree of variation is a predetermined value or more). For the determination condition, for example, a correlation coefficient of the plurality of reflection points in the Z-X plane may be used.

That is, in the first embodiment, the approximate straight line KL is used to estimate the vertical axis deviation angle θp; thus, in this case, the determination on the variation is performed by eliminating reflection points with a large variation in the position, and extracting reflection points with a small variation in the position that make it possible to obtain the approximate straight line KL that can be used to estimate the vertical axis deviation angle θp.

In S420, since the variation is determined to be small in S410 described above, for all the reflection points of the roadside object point group, equation (1) of the approximate straight line KL is obtained using a least-squares method. That is, the following approximate straight line KL in the Z-X plane of the device coordinates is obtained. In equation (1), β is a slope, and C is an intercept.

$$Zs=\beta Xs+C \tag{1}$$

In subsequent S430, it is determined whether an inflection point determination condition is satisfied. In this step, in response to an affirmative determination, control proceeds to S440, and in response to a negative determination, the process is temporarily ended.

Figure 14:
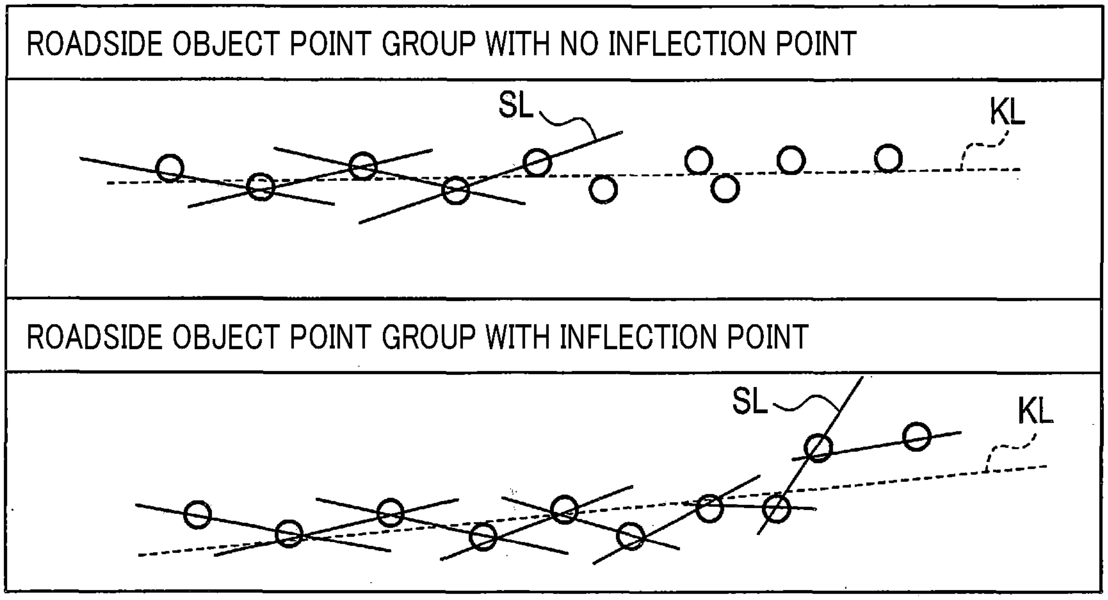
FIG. 14 is an explanatory diagram showing an inflection point of a reflection point group.

The inflection point determination condition is a condition for determining whether the plurality of roadside object points (i.e., the plurality of reflection points) as a whole are arranged in an approximately straight line in the Z-X plane of the device coordinates as shown in FIG. 14.

For example, as shown in FIG. 14, the approximate straight line KL is obtained for all the reflection points of the roadside object point group, and a straight line SL is drawn between adjacent reflection points. Then, it may be determined that the inflection point determination condition is not satisfied (i.e., there is an inflection point) when an angle at which the approximate straight line KL intersects with each straight line SL is a predetermined value or more. Two reflection points between which the straight line SL is drawn may not necessarily be adjacent reflection points, and may be two reflection points separated from each other by the minimum distance among reflection points separated from each other by a predetermined distance or more.

That is, in the first embodiment, the vertical axis deviation angle θp is estimated in a situation in which a roadside object such as the guardrail 41 continuously extends along the road in a certain state, for example, at a constant height; thus, in this case, it is determined whether the roadside object continuously extends in such a state.

The roadside object point group shown on the upper side of FIG. 14 is an example of a roadside object point group having no inflection point, and the roadside object point group shown on the lower side of FIG. 14 is an example of a roadside object point group having an inflection point. A roadside object point group "having an inflection point" indicates that a plurality of reflection points of the roadside object point group are not arranged in a straight line and are arranged discontinuously at a certain point.

In S440, an angle corresponding to the slope β of the equation (1) indicating the approximate straight line KL (i.e., slope angle βk) is obtained, and the sign of the angle is reversed to obtain the vertical axis deviation angle θp, and then the process is temporarily ended. Thus, the vertical axis deviation angle θp of the radar device 3 can be obtained.

Figure 15:
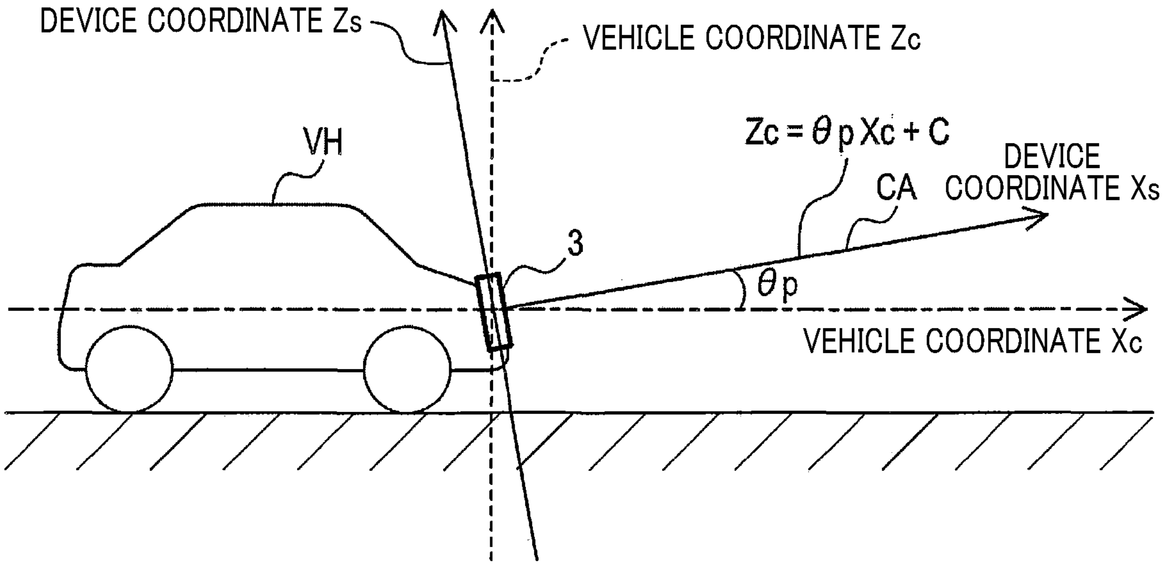
FIG. 15 is an explanatory diagram showing a relationship between vehicle coordinates, device coordinates, and the vertical axis deviation angle.

FIG. 15 shows a relationship between the device coordinates and the vehicle coordinates. In this case, the vertical axis deviation angle θp of upward axis deviation of the radar device 3 has a positive value; thus, for example, the longitudinal axis Xs of the device coordinates is rotated counterclockwise by the vertical axis deviation angle θp with respect to the traveling direction axis Xc of the vehicle coordinates.

Thus, in the vehicle coordinates, the straight line indicating the center axis CA whose direction is the direction of the radar device 3 can be expressed by the following equation (2). C is an intercept.

$$Zc = \theta p Xc + C \tag{2}$$

1-5. Effects

The first embodiment provides the following effects.

(1a) The first embodiment includes the object information acquisition unit 31, the roadside object extraction unit 33, and the axis deviation angle estimation unit 35.

In the first embodiment, the above configuration makes it possible to easily extract, from reflection object information on a reflection object corresponding to a reflection point of a radar wave obtained by driving the radar device 3, roadside object information such as a position of the reflection point on a roadside object such as the guardrail 41 provided along a travel path. For example, the guardrail 41 is provided at a constant height along the road on the side of the road at a higher position than the road surface. Thus, even when the direction of a radar beam is deviated upward, a reflected wave from the guardrail 41 is more easily detected than a reflected wave from the road surface.

That is, even when the direction of the radar device 3 is deviated upward, a reflected wave from the guardrail 41 is more easily detected than a reflected wave from the road surface. Furthermore, even when the guardrail 41 is located away from the radar device 3, a reflected wave from the guardrail 41 can be easily detected.

Thus, in the first embodiment, it is possible to accurately estimate the vertical axis deviation angle θp of the radar device 3 based on roadside object information obtained by using a reflected wave from a roadside object such as the guardrail 41 having such characteristics.

(1b) In the first embodiment, a plurality of reflection points on a roadside object such as the guardrail 41 that are arranged in the vertical plane in the direction of travel of the own vehicle VH are approximated by a straight line, based on the roadside object information described above. Then, the vertical axis deviation angle θp can be estimated using the approximate straight line KL.

For example, the guardrail 41 is provided at a constant height in a strip shape along the vertical plane. Specifically, the guardrail 41 is provided at a constant height in a strip shape so as to continuously extend along the road and parallel to the road surface. Thus, in the vertical plane, a plurality of reflection points of a radar wave are distributed in an approximately strip shape having a slope at an angle corresponding to the vertical axis deviation angle θp. This makes it possible to accurately estimate the vertical axis deviation angle θp based on the approximate straight line KL obtained from the reflection points distributed in a strip shape.

(1c) In the first embodiment, the vertical axis deviation angle θp is not estimated when there is an inflection point in reflection points on the guardrail 41 that are distributed in the vertical plane, that is, when a plurality of reflection points arranged in the vertical plane are approximated by a straight line and there is an inflection point in the reflection points.

That is, the vertical axis deviation angle θp is estimated when the condition that allows accurate estimation of the vertical axis deviation angle θp is satisfied; thus, it is possible to obtain the vertical axis deviation angle θp with high accuracy.

(1d) In the first embodiment, the vertical axis deviation angle θp is not estimated based on the roadside object information when the degree of variation in position of the plurality of reflection points on the roadside object in the vertical plane is a predetermined value or more.

That is, the vertical axis deviation angle θp is estimated when the condition that allows accurate estimation of the vertical axis deviation angle θp is satisfied; thus, it is possible to obtain the vertical axis deviation angle θp with high accuracy.

(1e) In the first embodiment, the vertical axis deviation angle θp is estimated when the own vehicle VH is traveling in a straight line.

That is, the vertical axis deviation angle θp is estimated when the condition that allows accurate estimation of the vertical axis deviation angle θp is satisfied; thus, it is possible to stably obtain the vertical axis deviation angle θp with high accuracy.

1-6. Correspondence Between Terms

In a relationship between the first embodiment and the present disclosure, the vehicle VH corresponds to a moving object, the radar device 3 corresponds to a radar device, the control device 5 corresponds to an axis deviation estimation device, the object information acquisition unit 31 corresponds to an object information acquisition unit, the roadside object extraction unit 33 corresponds to a roadside object extraction unit, and the axis deviation angle estimation unit 35 corresponds to an axis deviation angle estimation unit.

2. Second Embodiment

A second embodiment has the same basic configuration as the first embodiment, and thus differences from the first embodiment will be mainly described below. In the second embodiment, the same reference numerals as in the first embodiment denote the same components, and the preceding description will be referred to.

In the second embodiment, the axis deviation angle estimation unit 35 is configured to estimate the vertical axis deviation angle θp by weighting, of reflection object information indicating roadside object information, reflection object information on a reflection object located more than a predetermined distance away from the own vehicle VH.

Figure 16:
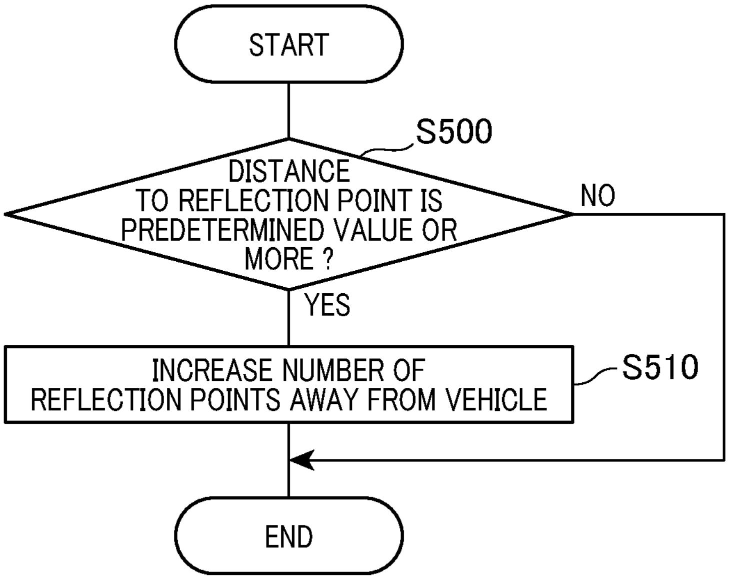
FIG. 16 is a flow chart showing a process in a second embodiment.

For example, when a plurality of reflection points corresponding to a roadside object are detected, as shown in FIG. 16, in S500, the control device 5 determines whether the reflection points are in a region located more than a predetermined distance away from the own vehicle VH. In response to a determination that the reflection points are in the region, in S510, the number of reflection points is increased, for example, to twice or the like.

Thus, when the approximate straight line KL is obtained for a plurality of reflection points using a least-squares method, the approximate straight line KL can be obtained based on the reflection points including more reflection points located away from the own vehicle VH (i.e., based on the reset reflection points).

Figure 13:
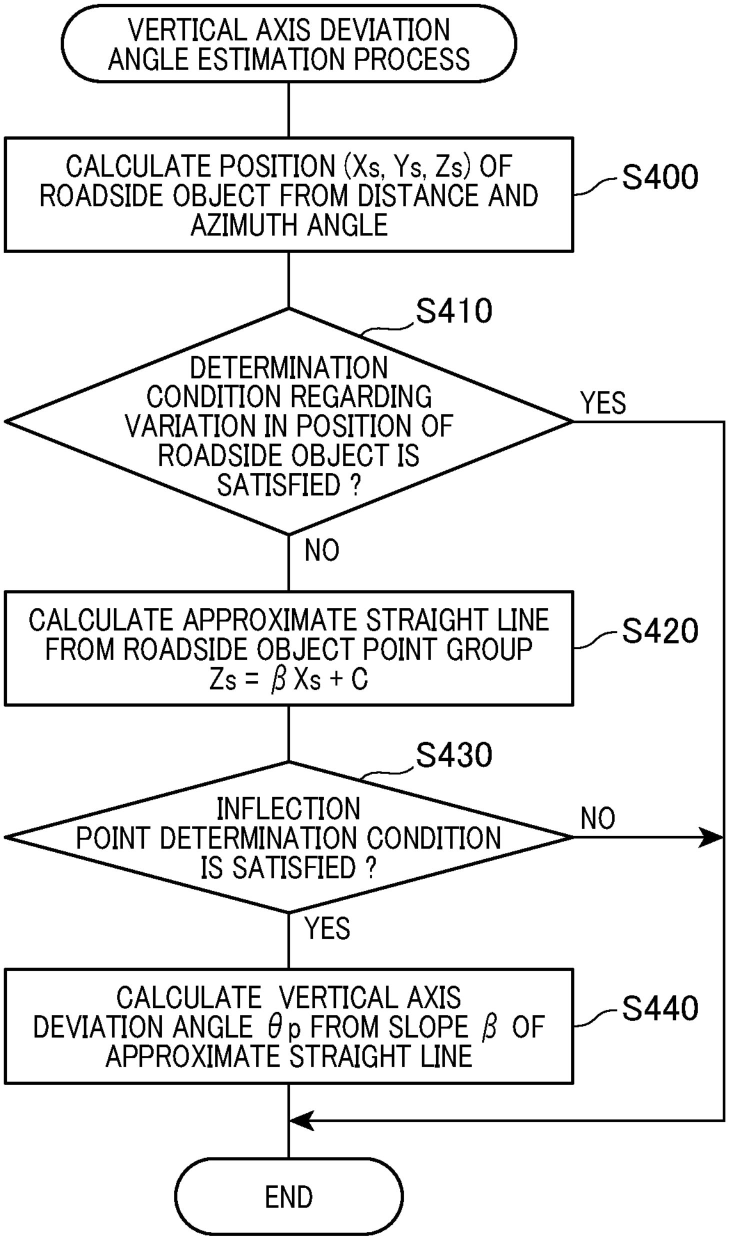
FIG. 13 is a flow chart showing a vertical axis deviation angle estimation process.

The process in FIG. 16 can be performed, for example, after the process in S400 shown in FIG. 13. Thus, the position of the reflection point on the roadside object can be reset.

Specifically, in a region located near the radar device 3, a reflected wave is more likely to include various types of noise, and this tends to make it more difficult to obtain accurate information on a position of a reflection point or the like than in a region located away from the radar device 3. Thus, in the second embodiment, more importance is placed on information on a reflection point located away from the radar device 3, and such reflection point information is weighted.

Therefore, more accurate information on the arrangement of the reflection points is obtained, and this makes it possible to obtain a more accurate approximate straight line KL with less error or the like. Thus, from the approximate straight line KL with high accuracy, it is possible to obtain the vertical axis deviation angle θp with higher accuracy.

The second embodiment also provides the same effects as the first embodiment.

3. Third Embodiment

A third embodiment has the same basic configuration as the first embodiment, and thus differences from the first embodiment will be mainly described below. In the third embodiment, the same reference numerals as in the first embodiment denote the same components, and the preceding description will be referred to.

In the third embodiment, when map information indicating a travel path in which the own vehicle VH travels and an area around the travel path includes information on a position of a roadside object such as the guardrail 41, the map information is used, for example, to extract reflection object information indicating roadside object information.

Figure 17:
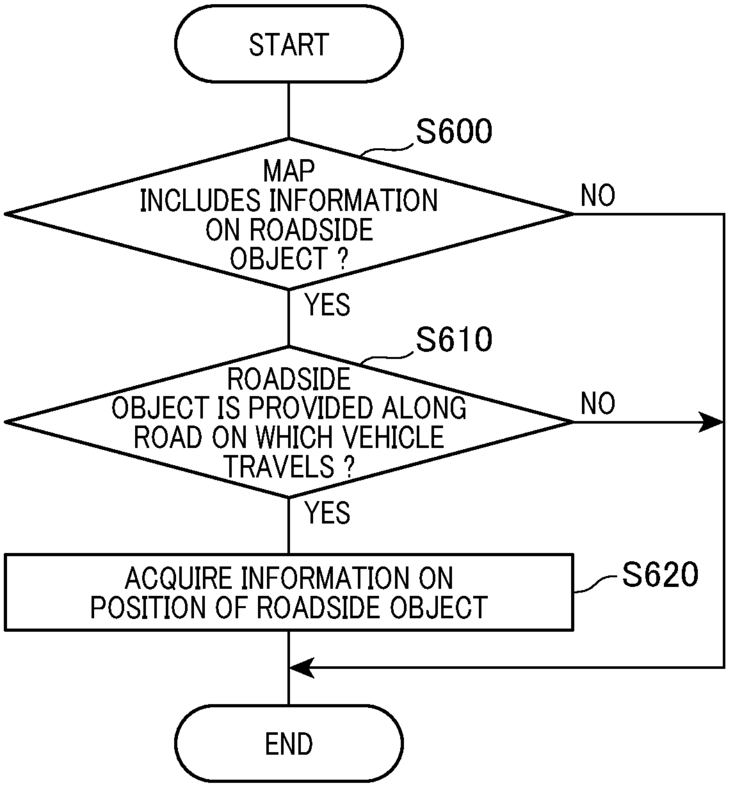
FIG. 17 is a flow chart showing a process in a third embodiment.

For example, as shown in FIG. 17, in S600, the control device 5 determines whether the navigation device 17 uses a map including a position of a roadside object such as the guardrail 41.

In response to a determination that the navigation device 17 uses the map including a position of a roadside object, in S610, based on information in the map and information on a position of the own vehicle VH, it is determined whether a roadside object such as the guardrail 41 is provided along the road on which the own vehicle VH travels. In response to a determination that a roadside object is provided along the road, in S620, information on a position of the roadside object with respect to the own vehicle VH is acquired, for example, information on a region in which the roadside object is located in a plane is acquired.

When no roadside object is provided along the road, there is no roadside object required to estimate an axis deviation; thus, various processes required to estimate the axis deviation may not be performed.

The process in FIG. 17 can be performed, for example, before the roadside object candidate point extraction process shown in FIG. 11. The information on the region in which the roadside object is located that is obtained from the map information can be used, for example, before or after the process in any of the steps S200 to S240. Specifically, before or after the process in any of the steps S200 to S240, a process for narrowing the range of roadside object candidate points may be performed using, as a determination condition for the narrowing process, the information on the region in which the roadside object is located that is obtained from the map information.

Thus, the process described above provides, based on the map information, information on a position of a roadside object and a region in which the roadside object is located. When a roadside object is actually detected by the radar device 3, therefore, the use of the map information enables accurate extraction of a roadside object. This makes it possible to more accurately estimate the vertical axis deviation angle θp.

The third embodiment also provides the same effects as the first embodiment.

4. Fourth Embodiment

A fourth embodiment has the same basic configuration as the first embodiment, and thus differences from the first embodiment will be mainly described below. In the fourth embodiment, the same reference numerals as in the first embodiment denote the same components, and the preceding description will be referred to.

In the fourth embodiment, as shown in FIG. 1, a front radar device 3*a* and a side radar device 3*b* are provided as the radar device 3. The front radar device 3*a* detects an object (i.e., reflection object) in the forward direction which is the direction of travel of the own vehicle VH. The side radar device 3*b* detects an object (i.e., reflection object) beside the own vehicle VH.

In the fourth embodiment, the vertical axis deviation angle θp is estimated when the front radar device 3*a* and the side radar device 3*b* are capable of detecting a roadside object.

Figure 18:
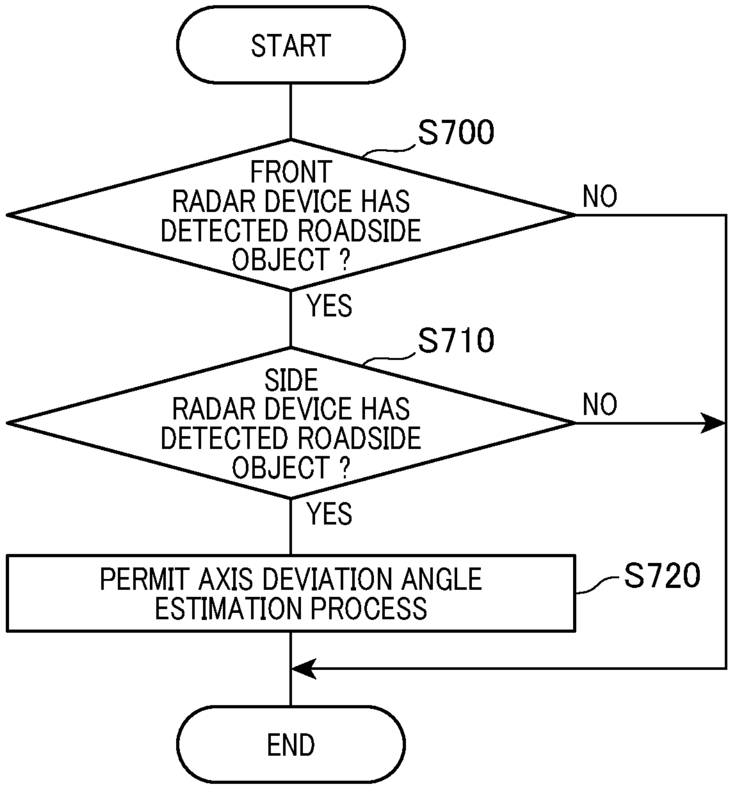
FIG. 18 is a flow chart showing a process in a fourth embodiment.

For example, as shown in FIG. 18, in the case where it is determined in S700 that the front radar device 3*a* has detected a roadside object and it is determined in S710 that the side radar device 3*b* has detected the roadside object, in S720, the control device 5 may permit estimation of the vertical axis deviation angle θp.

The process in FIG. 18 can be performed, for example, after the roadside object candidate point extraction process or the roadside object point group extraction process is performed by the radar devices 3*a* and 3*b*.

Finally, the vertical axis deviation angle θp can be estimated using the reflection point information obtained by the front radar device 3*a*.

Thus, a roadside object is reliably determined, and this makes it possible to obtain the vertical axis deviation angle θp with high accuracy.

The fourth embodiment also provides the same effects as the first embodiment.

5. Other Embodiments

The embodiments of the present disclosure have been described above. However, the present disclosure is not limited to the embodiments described above, and can be variously modified.

(5a) The radar device of the present disclosure is not limited to a radar device capable of detecting a roadside object in the forward direction of the own vehicle (i.e., in front of the own vehicle). The radar device of the present disclosure may be a radar device capable of detecting a roadside object in any direction including a roadside object behind the own vehicle, a roadside object in the front-side direction (e.g., diagonally left in front or diagonally right in front) of the own vehicle, and a roadside object beside (e.g., on the left side or right side of) the own vehicle. That is, the radar device of the present disclosure is not particularly limited as long as the radar device is capable of detecting a roadside object such as a guardrail.

Of the radar devices described above, at least two or more types of radar devices may be combined. For example, the vertical axis deviation angle may be estimated by selecting, among the radar devices, a radar device that has detected a roadside object, and using reflection object information obtained by the radar device.

(5b) The radar device of the present disclosure may not necessarily be an FMCW radar device as described above, and may be various radar devices such as a 2FCW radar device, an FCM radar device, or a pulse radar device. 2FCW is an abbreviation for Two-Frequency Modulated Continuous Wave, and FCM is an abbreviation for Fast-Chirp Modulation.

(5c) In the above embodiments, data obtained by the radar device is transmitted to the control device (e.g., the axis deviation estimation device) to perform processing of the data (e.g., the axis deviation estimation process). However, the radar device may perform processing of the data (e.g., the axis deviation estimation process performed by the axis deviation estimation device). The data may be processed by the sensors of the in-vehicle sensor group. Alternatively, data obtained by the sensors may be transmitted to the control device or the like, and the control device may perform various processes.

(5d) The roadside object may not necessarily be a protective fence, and may be, for example, a plurality of blocks arranged in a direction in which the road extends, or a plurality of poles dividing a lane or the like. Furthermore, the protective fence may be, for example, various vehicle protective fences or pedestrian/bicycle protective fences such as a guardrail, a guide pipe, a guide cable, or a box beam.

The roadside object may be, for example, a roadside object composed of a plurality of structures such as a plurality of blocks or a plurality of poles as described above, or a roadside object composed of a single integrated structure. The roadside object may be, for example, various protective fences or concrete side walls that are continuously and integrally provided over a long distance in a direction in which the road extends.

(5e) The control device and the method thereof described in the present disclosure may be implemented by a dedicated computer provided by configuring a processor and a memory programmed to execute one or more functions embodied by a computer program.

Alternatively, the control device and the method thereof described in the present disclosure may be implemented by a dedicated computer provided by configuring a processor with one or more dedicated hardware logic circuits.

Alternatively, the control device and the method thereof described in the present disclosure may be implemented by one or more dedicated computers configured by combining a processor and a memory programmed to execute one or more functions and a processor configured by one or more hardware logic circuits.

The computer program may be stored as instructions executed by a computer in a non-transitory tangible computer-readable storage medium. The method for implementing the functions of the components of the control device may not necessarily include software, and all the functions may be implemented by one or more pieces of hardware.

(5f) In the above embodiments, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, part of the configuration of the above embodiments may be omitted. Furthermore, at least part of the configuration of the above embodiments may be added to or replaced with another configuration of the above embodiments.

(5g) Other than the control device described above, the present disclosure may also be implemented in various forms such as a system including the control device as a component, a program for causing a computer to function as the control device, a non-transitory tangible storage medium such as a semiconductor memory in which the program is recorded, and a control method.

What is claimed is:

1. An axis deviation estimation device for estimating an axis deviation of a radar device when the radar device is mounted on a moving object, the axis deviation estimation device comprising:

a controller including at least one of (i) a circuit and (ii) a processor with a memory storing computer program code executable by the processor, the at least one of the circuit and the processor configured to cause the controller to:

repeatedly acquire object information including an object distance and an object azimuth angle, the object distance being a distance between the radar device and a reflection object corresponding to a reflection point of a radar wave that is detected by the radar device, the object azimuth angle being an azimuth angle at which the reflection object is located;

extract roadside object information from the object information based on a predetermined extraction condition, the roadside object information being information on the reflection point on a roadside object provided in accordance with a predetermined condition on a side of a travel path at a higher position than the travel path in a direction in which the travel path extends, the travel path being a path in which the moving object travels; and estimate a vertical axis deviation angle from the roadside object information including information on a plurality of the reflection points, the vertical axis deviation angle being an angle of deviation of an actual mounting direction from a reference mounting direction in a vertical direction, the actual mounting direction being an actual direction of the radar device, the reference mounting direction being a direction of the radar device when the radar device is mounted in a reference state, wherein the roadside object provided in accordance with the predetermined condition is a roadside object located at a constant position in a height direction, and the predetermined extraction condition is the following conditions:

a reflection point is located in a strip-shaped region having a predetermined distance in a direction of travel of the moving object, a distance between a first reflection point and a second reflection point in the strip-shaped region being more than a predetermined distance, the first reflection point being located at a closest position relative to the moving object, the second reflection point being located at a farthest position relative to the moving object, wherein the controller is further configured to:

determine, among the plurality of the reflection points of the object information, a reflection point group that satisfies the predetermined extraction condition as a group including the plurality of the reflection points on the roadside object located at the constant position in the height direction; and extract, as the roadside object information, the determined reflection point group from the object information, wherein the controller is further configured to:

estimate the vertical axis deviation angle by calculating a slope of the arrangement of the plurality of the reflection points in the strip-shaped region based on the extracted roadside object information; and output an axis deviation diagnosis indicating that the axis deviation of the radar device has occurred in response to determining that the estimated vertical axis deviation angle is a predetermined value or more.

2. The axis deviation estimation device according to claim 1, wherein the controller is further configured to approximate, by a straight line, based on the roadside object information, the plurality of reflection points on the roadside object in the direction of travel of the moving object that are arranged in a vertical plane and to estimate the vertical axis deviation angle using the straight line.

3. The axis deviation estimation device according to claim 1, wherein the controller is further configured to estimate the vertical axis deviation angle by weighting, of the roadside object information, information on the roadside object located more than a predetermined distance away from the moving object.

4. The axis deviation estimation device according to claim 1, wherein the controller is further configured to approximate, by a first straight line, based on the roadside object information, the plurality of reflection points on the roadside object in the direction of travel of the moving object that are arranged in a vertical plane and to divide the plurality of reflection points on the roadside object that are arranged in the vertical plane into a plurality of regions in the direction of travel and approximate the reflection points in each of the plurality of regions by a second straight line, and the controller is further configured not to estimate the vertical axis deviation angle when a difference in slope between the first straight line and the second straight line is a predetermined value or more.

5. The axis deviation estimation device according to claim 1, wherein the controller is further configured not to estimate the vertical axis deviation angle based on the roadside object information when a degree of variation in position of the plurality of reflection points on the roadside object in a vertical plane is a predetermined value or more.

6. The axis deviation estimation device according to claim 1, wherein the controller is further configured to estimate the vertical axis deviation angle when the moving object is traveling in a straight line.

7. The axis deviation estimation device according to claim 1, wherein the controller is further configured to obtain map information indicating the travel path and an area around the travel path, which includes information on a position of the roadside object, from another device that differs from the axis deviation estimation device; and extract the roadside object information from the obtained map information.

8. The axis deviation estimation device according to claim 1, wherein the radar device includes a front radar device for detecting a reflection object in a forward direction which is the direction of travel of the moving object, and a side radar device for detecting a reflection object beside the moving object, the controller is further configured to estimate the vertical axis deviation angle in response to the front radar device and the side radar device being capable of detecting the roadside object.

9. The axis deviation estimation device according to claim 1, wherein the controller is further configured to:

perform a clustering process to divide the plurality of the reflection points in the determined reflection point group into a plurality of clusters;

determine that a distance of the reflection point in a depth direction corresponding to the direction of travel of the moving object, in all reflection points in each of the divided clusters, exceeds a certain range; and extract a cluster including all reflection points that satisfy a distance determination condition in the depth direction.

10. The axis deviation estimation device according to claim 9, wherein the controller is further configured to:

determine that a distance of the reflection point in a width direction corresponding to a lateral direction of the moving object, in all reflection points in the cluster extracted based on the distance determination condition in the depth direction, exceeds a certain range; and extract a cluster including all reflection points that satisfy the distance determination condition in the width direction.

11. An axis deviation estimation device for estimating an axis deviation of a radar device when the radar device is mounted on a moving object, the axis deviation estimation device comprising:

an object information acquisition unit configured to repeatedly acquire object information including an object distance and an object azimuth angle, the object distance being a distance between the radar device and a reflection object corresponding to a reflection point of a radar wave that is detected by the radar device, the object azimuth angle being an azimuth angle at which the reflection object is located;

a roadside object extraction unit configured to extract roadside object information from the object information based on a predetermined extraction condition, the roadside object information being information on the reflection point on a roadside object provided in accordance with a predetermined condition on a side of a travel path at a higher position than the travel path in a direction in which the travel path extends, the travel path being a path in which the moving object travels; and an axis deviation angle estimation unit configured to estimate a vertical axis deviation angle from the roadside object information including information on a plurality of the reflection points, the vertical axis deviation angle being an angle of deviation of an actual mounting direction from a reference mounting direction in a vertical direction, the actual mounting direction being an actual direction of the radar device, the reference mounting direction being a direction of the radar device when the radar device is mounted in a reference state, wherein the roadside object provided in accordance with the predetermined condition is a roadside object located at a constant position in a height direction, and the predetermined extraction condition is the following conditions:

a reflection point is located in a strip-shaped region having a predetermined distance in a direction of travel of the moving object, a distance between a first reflection point and a second reflection point in the strip-shaped region being more than a predetermined distance, the first reflection point being located at a closest position relative to the moving object, the second reflection point being located at a farthest position relative to the moving object, wherein the axis deviation estimation device is further configured to:

determine, among the plurality of the reflection points of the object information, a reflection point group that satisfies the predetermined extraction condition as a group including the plurality of the reflection points on the roadside object located at the constant position in the height direction;

extract, as the roadside object information, the determined reflection point group from the object information;

estimate the vertical axis deviation angle by calculating a slope of the arrangement of the plurality of the reflection points in the strip-shaped region based on the extracted roadside object information; and output an axis deviation diagnosis indicating that the axis deviation of the radar device has occurred in response to determining that the estimated vertical axis deviation angle is a predetermined value or more.

* * * * *